United States Patent
Marugame

[11] Patent Number: 5,995,649
[45] Date of Patent: Nov. 30, 1999

[54] DUAL-INPUT IMAGE PROCESSOR FOR RECOGNIZING, ISOLATING, AND DISPLAYING SPECIFIC OBJECTS FROM THE INPUT IMAGES

[75] Inventor: Atsushi Marugame, Tokyo, Japan

[73] Assignee: NEC Corporation, Tokyo, Japan

[21] Appl. No.: 08/935,141

[22] Filed: Sep. 22, 1997

[30] Foreign Application Priority Data

Sep. 20, 1996 [JP] Japan .................................. 8-271914

[51] Int. Cl.[6] ................................................ G06K 9/00
[52] U.S. Cl. .......................... 382/154; 382/190; 345/419
[58] Field of Search ................................ 382/190, 192, 382/193, 195, 199, 201, 203, 206, 151, 154, 291, 191; 348/94, 95; 345/425, 419; 364/559

[56] References Cited

U.S. PATENT DOCUMENTS

| | | | |
|---|---|---|---|
| 4,988,189 | 1/1991 | Kroupa et al. | 356/4 |
| 5,499,306 | 3/1996 | Sasaki et al. | 382/291 |
| 5,589,942 | 12/1996 | Gordon | 382/151 |
| 5,742,294 | 4/1998 | Watanabe et al. | 345/425 |
| 5,757,674 | 5/1998 | Marugame | 364/559 |
| 5,845,006 | 12/1998 | Sumi et al. | 382/154 |
| 5,850,352 | 12/1998 | Moezzi et al. | 364/514 A |
| 5,852,672 | 12/1998 | Lu | 382/154 |

FOREIGN PATENT DOCUMENTS

| | | | |
|---|---|---|---|
| 7-154777 | 6/1995 | Japan | H04N 7/18 |
| 7-1777423 | 7/1995 | Japan | H04N 5/232 |
| 7-220095 | 8/1995 | Japan | G06T 9/20 |

OTHER PUBLICATIONS

"Effects and Safety of Ultraviolet and Infrared Light on Eye", The Illustration Society Magazine, vol. 61, No. 11, 636–641 (1977).

Primary Examiner—Matthew C. Bella
Attorney, Agent, or Firm—Foley & Lardner

[57] ABSTRACT

An image processor comprising an image pickup portion to take in an image of an object, a reference point extracting portion that extracts a reference point to be used in object extraction from images taken by the image pickup portion, a corresponding point detecting portion that detects a corresponding point in other images, a three dimensional coordinates value calculating portion that calculates a three dimensional coordinates value of an object by using the absolute position and posture parameters calculated by using image of a reference solid and coordinates values of reference point and corresponding point, a contour point extracting portion that extracts a contour point to show contour of an object on the basis of coordinate values of reference point and three dimensional coordinate values, and an object display control portion that extracts an image of the object from images photographed by the image pickup portion based on coordinates value of contour point and displays it on a display device.

19 Claims, 15 Drawing Sheets

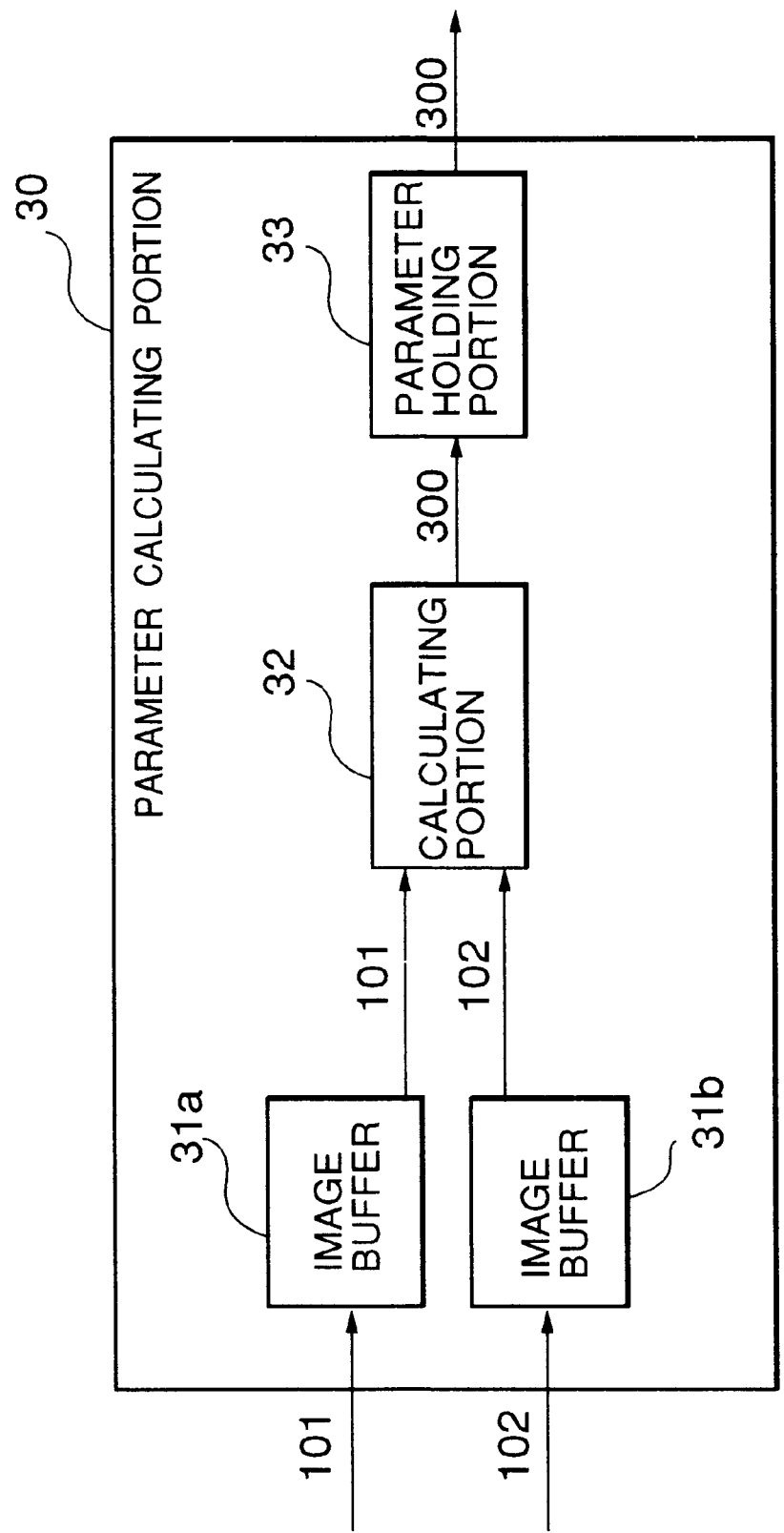

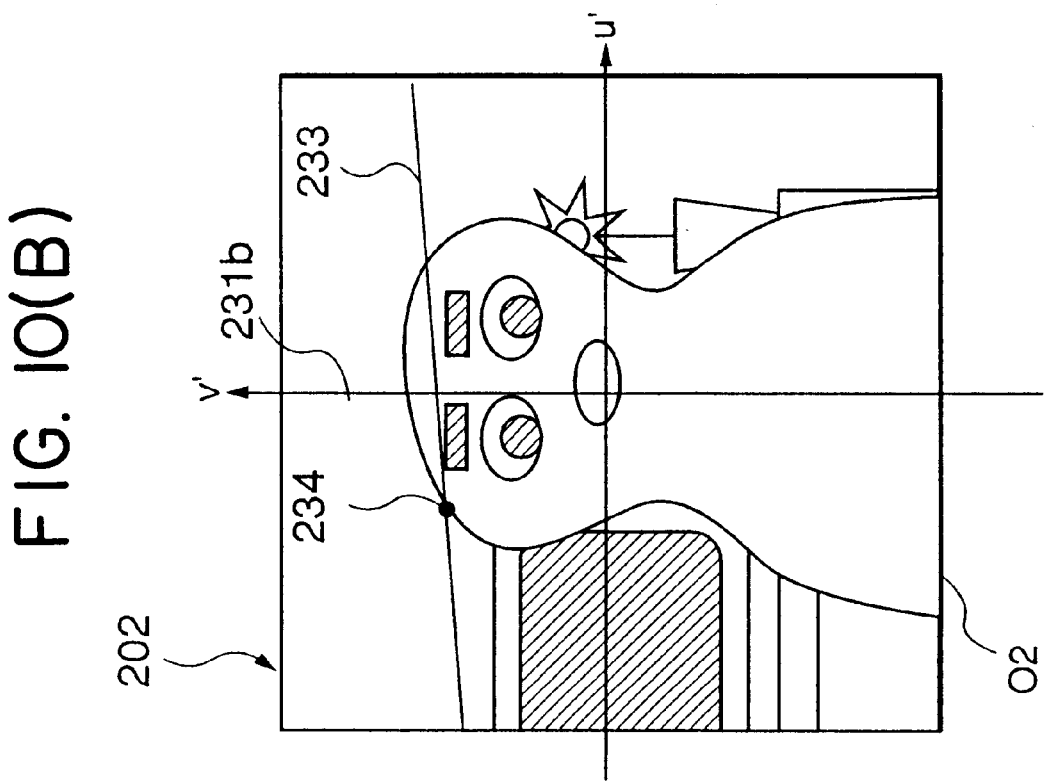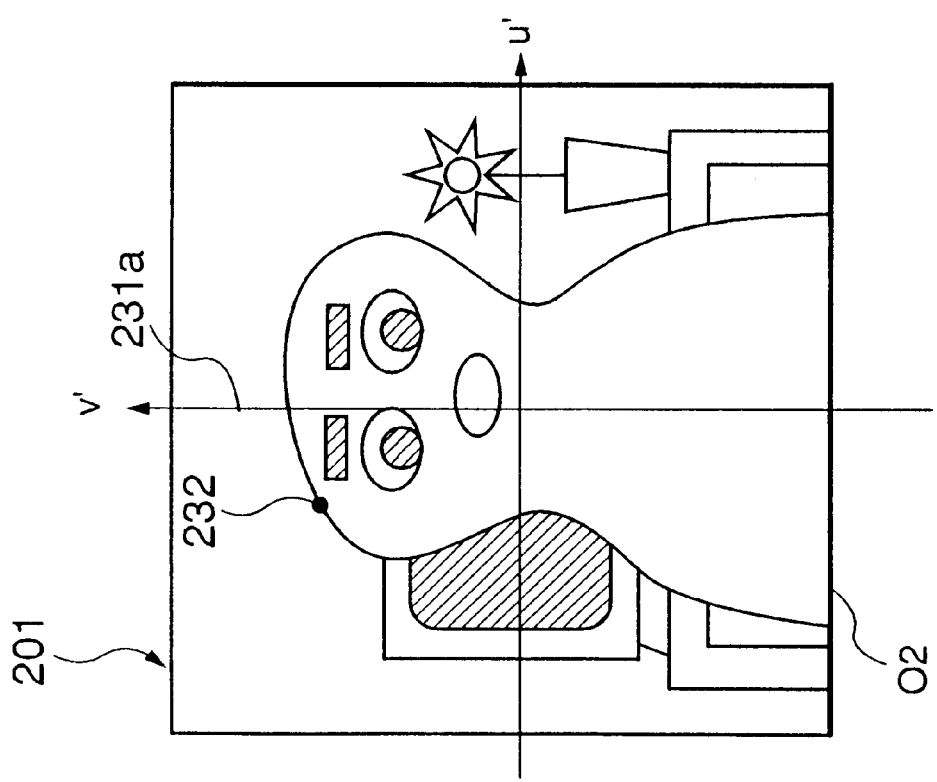

DUAL-INPUT IMAGE PROCESSOR FOR RECOGNIZING, ISOLATING, AND DISPLAYING SPECIFIC OBJECTS FROM THE INPUT IMAGES

BACKGROUNDS OF THE INVENTION

1. Field of the Invention

The present invention relates to an image processor to take in and process image data. More specifically the present invention relates to an image processor to extract only an image of a specific object in a designated space among input images.

2. Description of the Related Art

Various image processing technologies to extract only a specific object among an image have been proposed by those skilled in the art.

A technology according to the prior art is the technology disclosed in the Japanese Patent Publication (Kokai) No. Heisei 7-177423 "A Compound Eye Image Pickup Device". In the above publication, a method to calculate the distance to an object based on a disparity between images captured by plural image pickup devices is proposed. The compound eye image pickup device described in the above publication is one to takes in plural image signals by using plural image pickup systems in order to pick up an image of an object and creates a synthetic image, and is equipped with a means to control the order for the corresponding point extracting portion that extracts positions of the common portions from plural images to be obtained by each of the image pickup systems to judge the common portions in an image. Thereby, in the case to obtain a synthetic panoramic image from plural images, identical objects existing in each image is extracted in a rapid manner. The object extracting method described in the above publication finds out corresponding portions in each image taken by the plural image pickup devices, and extracts a coordinate difference in the image as a disparity, and separates objects existing in the foreground of the image by using the size of extracted disparity.

However, in the conventional method to judge the depth by disparity by using the plural image pickup devices, a threshold value to distinguish the foreground and the background greatly affects the accuracy of extraction, and difficulty to determine such a threshold value prevents accurate extraction, which has been a problem with the conventional method according to the prior art.

The device in the above Japanese Patent Publication (Kokai) No. Heisei 7-177423 tries to solve the difficulty in determining the above threshold value by obtaining three dimensional coordinates from disparitys of plural image pickup systems. For that purpose, however a great deal of efforts are required to control and measure the relative position and optical axis angles among plural image pickup devices. And in the case of false corresponding wrong points in the corresponding point acquiring search among photographed images, undesirable portion may be extracted as a noise in image data or the corresponding portion of an object may be missing, which has been other problem with the above conventional method according to the prior art.

Other example of the conventional image processing technologies is the one disclosed in the Japanese Patent Publication (Kokai) No. Heisei 7-154777 "An Image Processor and A Video Telephone Device". In the above publication, proposed is a device wherein infrared light is radiated on an object from the light receiving means side, and the input light is separated into visible light and infrared light reflected by the object by that light receiving means, and an area where the strength of infrared light is larger than a threshold value is extracted from visible light image as a mask area, and thereby only an image of an object at a short distance from a camera may be easily extracted. The object extracting method described in the above publication is one that radiates infrared light to an object, and separates reflected visible light and reflected infrared light from the light in the received light scope, and extracts a portion where the strength of infrared light exceeds threshold value among images created by separated reflected visible light as an object.

However, the technology in the above Japanese Patent Publication (Kokai) No. Heisei 7-154777 may require radiation of strong infrared light onto an object according to illumination condition or other conditions. And the use of an infrared light radiating device that can radiate strong level of infrared light increases costs to a great extent, which has been a problem with the above conventional method according to the prior art.

And in the case when an object is a human being, the document "Effects and Safety of Ultraviolet and Infrared Light on Eye" (The Illustration Society Magazine, vol.61, No.11, Pages 636 to 641, 1977) reports there was a fear that the human body was affected badly if a high level of infrared light is radiated onto a human body.

A further example of the conventional image processing technologies according to the prior art is the one disclosed in the Japanese Patent Publication (Kokai) No. Heisei 7-220095 "An Object Image Extracting Device". In the above publication, proposed is a device wherein data about an object and data about an image pickup device sensor are accumulated in memory in advance, and when an object is extracted from an image obtained by using image pickup device, a precise object in an image is extracted without noise by using the data accumulated in memory. The object extracting method described in the above publication records the data about an object such as its size and so forth, and the data about the distance between the principal point of the object, the focal length and the size of sensor, the number of pixels, and other data about image pickup device in advance, and it forecasts an object existing portion in an image on the basis of the data about image pickup device, and extracts part of a photographed image to become a candidate for object. And the most consistent part with the data about the object in the part is selected as an object.

However, the technology described in the above Japanese Patent Publication (Kokai) No. Heisei 7-220095 requires the acquisition and accumulation in advance of the data about object and the data about image pickup device, and it was impossible to extract an image of an object whose data were not stored in advance, which has been a problem with the above conventional method according to the prior art.

Furthermore, the extraction of an object according to the above prior art requires the distance from the principal point of an image of an object to the object concerned, or the distance from the principal point of an image of an object to the image. And to obtain the distance from the principal point of an object to the object concerned, required was an expensive device such as an infrared light radiating device and so forth. And it was difficult to obtain a stable distance from the principal point of an image to the image.

SUMMARY OF THE INVENTION

Accordingly, an object of the present invention is to provide an image processor that easily determines a threshold value to judge the foreground and the background at extraction of an object by disparity data obtained by plural image pickup devices.

Another object of the present invention is to provide an image processor that enables to extract only an object image from input images without position and posture adjustments of image pickup devices.

Another object of the present invention is to provide an image processor that corrects noise and missing in object extraction by using plural image pickup devices.

Another object of the present invention is to provide an image processor that can extract an object image from input images without using any special device such as an infrared light radiating device.

According to one aspect of the invention, an image processor that extract only an image of a specific object from input images, comprises an image pickup means that is equipped with plural image pickup devices for picking up the object, a parameter calculating means for extracting feature points on a reference solid from the images obtained by picking up the reference solid where a known pattern is painted by the image pickup means, and calculating the relative position and posture parameters of the image pickup device arranged on the image pickup means, a reference point extracting means for extracting a reference point as a feature point having features on image, with one image of plural images photographed by the image pickup means, and calculating coordinate values of the image of the reference point, a corresponding point detecting means for detecting corresponding points to be feature points having features on image in correspond with the reference points, with all the images except the images that extract the reference points, among the plural images, by coordinate values of the reference points extracted by the reference point extracting means, and calculating coordinate values in each image at the corresponding points, a three dimensional coordinates calculating means for calculating coordinate values in the three dimensional space of the reference point, by using the relative position and posture parameters of the image pickup device calculated by the parameter calculating means, coordinate values of the reference point extracted by the reference point extracting means, and coordinate values of the corresponding point detected by the corresponding point detecting means, a contour point extracting means for extracting contour points showing a contour of the object among images photographed by the image pickup means, based on coordinate values of the reference points extracted by the reference point extracting means and the three dimensional coordinates values calculated by the three dimensional coordinates value calculating means, and calculating their coordinate values, and an object display means for extracting an image of the object from images photographed by the image pickup means on the basis of coordinate values of the contour points extracted by the contour point extracting means, and displaying them on a display device.

The parameter calculating means extracts six feature points or more having features on image from plural planes of the reference solid, and calculates their coordinate values, and calculates the parameters by using the least square method in equations including the calculated coordinate values.

The parameter calculating means extracts six feature points or more having features on image from plural planes of the reference solid, and calculates their coordinate values, and calculates the parameters by using the least square method in equations including the calculated coordinate values, the corresponding point detecting means leads a straight line including the corresponding points corresponding to the reference points, in other images than images that extract the reference points, by using parameters calculated by the parameter calculating means, searches for corresponding point candidates to be feature points having features on image, on the straight line, and carries out a block matching processing on the searched above corresponding point candidate, and makes the corresponding point candidates as corresponding points at which an obtained block error is below a threshold value.

In the preferred construction, the image processor further comprises a noise correcting means for judging whether the extracted contour point is a true contour point or a noise based on the presence or absence of continuity of the coordinate values in the contour point extracted by the contour point extracting means, and extracting other contour candidate points in a portion judged as a noise, on the basis of coordinate values of a true contour point near the portion, and outputting them to the corresponding point detecting means and the three dimensional coordinates calculating means, and outputting the coordinate values of the contour points where there is no noise portion or noise portion that has been corrected to the object display means, wherein the corresponding point detecting means detects corresponding points based on the contour point candidate, when contour point candidates are input from the noise correcting means, the three dimensional coordinates calculating means calculates three dimensional coordinates values of the contour point on the basis of corresponding points of the contour point candidates detected by contour point candidate and the corresponding point detecting means, when contour point candidates are input from the noise correction means, and the object display means extracts an image of the object from images photographed by the image pickup means on the basis of coordinate values of the contour point input from the noise correction means.

In the preferred construction, the image processor further comprises a noise correcting means for judging whether the extracted contour point is a true contour point or a noise based on the presence or absence of continuity of the coordinate values in the contour point extracted by the contour point extracting means, and extracting other contour candidate points in a portion judged as a noise, on the basis of coordinate values of a true contour point near the portion, and outputting them to the corresponding point detecting means and the three dimensional coordinates calculating means, and outputting the coordinate values of the contour points where there is no noise portion or noise portion has been corrected to the object display means, wherein the corresponding point detecting means, leads a straight line including the corresponding points corresponding to the reference points, in other images than images that extract the reference points, by using parameters calculated by the parameter calculating means, searches for corresponding point candidates to be feature points having features on image, on the straight line, carries out a block matching processing on the above searched corresponding point candidate, and makes the corresponding point candidates as corresponding points at which an obtained block error is below a threshold value, and when contour point candidates are input from the noise correcting means, detects corresponding points based on the contour point candidates, the three dimensional coordinates calculating means calculates three dimensional coordinates values of the contour point based on corresponding points of the contour point candidates detected by contour point candidate and the corresponding point detecting means, when contour point candidates are input from the noise correction means, and the object display means extracts an image of the object from images photographed by the image pickup means on the basis of coordinate values of the contour point input from the noise correction means.

In another preferred construction, the image processor further comprises a noise judging means for judging whether the contour point extracted based on the presence or absence of continuity of coordinate values in the contour point extracted by the contour point extracting means is a true contour point or a noise, a contour smoothing processing means for correcting the contour point that the noise judging means judges as a noise in consideration of the continuity with other contour points that are judged as true, and outputting it to the object display means, wherein the object display means extracts an image of the object from images photographed by the image pickup means on the basis of the coordinate values of the corrected contour point input from the contour smoothing processing means, and displays it on a display device.

In another preferred construction, the image processor further comprises a noise judging means for judging whether the contour point extracted on the basis of the presence or absence of continuity of coordinate values in the contour point extracted by the contour point extracting means is a true contour point or a noise, a contour smoothing processing means for correcting the contour point that the noise judging means judges as a noise in consideration of the continuity with other contour points that are judged as true, and outputting it to the object display means, wherein the object display means extracts an image of the object from images photographed by the image pickup means based on the coordinate values of the corrected contour point input from the contour smoothing processing means, and displays it on a display device, the corresponding point detecting means leads a straight line including the corresponding points corresponding to the reference points, in other images than images that extract the reference points, by using parameters calculated by the parameter calculating means, searches for corresponding point candidates to be feature points having features on image, on the straight line, and carries out a block matching processing on the searched above corresponding point candidate, and makes the corresponding point candidates as corresponding points at which an obtained block error is below a threshold value.

According to another aspect of the invention, an image processor that extract only an image of a specific object from input images, comprises an image pickup means that is equipped with plural image pickup devices for picking up the object, a parameter calculating means for extracting feature points on a reference solid from the images obtained by picking up the reference solid where a known pattern is painted by the image pickup means, and calculating the relative position and posture parameters of the image pickup device arranged on the image pickup means, a reference point extracting means for extracting a reference point as a feature point having features on image, with one image of plural images photographed by the image pickup means, and calculating coordinate values of the image of the reference point, a corresponding point detecting means for detecting corresponding points to be feature points having features on image in correspond with the reference points, with all the images except the images that extract the reference points, among the plural images, by coordinate values of the reference points extracted by the reference point extracting means, and carrying out a block matching processing by using plural size blocks to the corresponding point candidate, and setting all the corresponding point candidates where obtained block error is below a threshold value as corresponding points, and calculating the unit of coordinate value in each image of all the corresponding points, a block size designating means for designating the block size to be used in the block matching, a three dimensional coordinates calculating means for calculating coordinate values in the three dimensional space of the reference point per coordinate value of the corresponding point, by using the relative position and posture parameters of the image pickup device calculated by the parameter calculating means, coordinate values of the reference point extracted by the reference point extracting means, and unit of coordinate values of the corresponding point detected by the corresponding point detecting means, an object extracting means for extracting a contour point to show a contour of the object from images photographed by the image pickup means per the three dimensional coordinates value, on the basis of unit of coordinate value of the reference point extracted by the reference point extracting means and the three dimensional coordinates value calculated by the three dimensional coordinates value calculating means, and calculating its coordinate value, and based on each coordinate value of the contour point, extracting an image of the object from images photographed by the image pickup means and creating unit of object image, and an image synthesizing means for synthesizing unit of object image created by the object extracting means and displaying it on a display device.

The parameter calculating means extracts six feature points or more having features on image from plural planes of the reference solid, and calculates their coordinate values, and calculates the parameters by using the least square method in equations including the calculated coordinate values.

The parameter calculating means extracts six feature points or more having features on image from plural planes of the reference solid, and calculates their coordinate values, and calculates the parameters by using the least square method in equations including the calculated coordinate values, the corresponding point detecting means leads a straight line including the corresponding points corresponding to the reference points, in other images than images that extract the reference points, by using parameters calculated by the parameter calculating means, searches for candidates of point corresponding to be feature points having features on image, on the straight line, and carries out a block matching processing on the searched above corresponding point candidate by using the block of size designated by the block size designating device.

In the preferred construction, the image processor further comprises a noise correcting means for judging whether the extracted contour point is a true contour point or a noise on the basis of the presence or absence of continuity of the coordinate values in the contour point extracted by the contour point extracting means, and extracting other contour candidate points in a portion judged as a noise based on coordinate values of a true contour point near the portion, and outputting them to the corresponding point detecting means and the three dimensional coordinates calculating means, and outputting the coordinate values of the contour points where there is no noise portion or noise portion has been corrected to the object display means, wherein the corresponding point detecting means detects corresponding points based on the contour point candidate, when contour point candidates are input from the noise correcting means, the three dimensional coordinates calculating means calculates three dimensional coordinates values of the contour point on the basis of corresponding points of the contour point candidates detected by contour point candidate and the corresponding point detecting means, when contour point candidates are input from the noise correction means, and the object display means extracts an image of the object from images photographed by the image pickup means on the basis of coordinate values of the contour point input from the noise correction means.

In the preferred construction, the image processor further comprises a noise correcting means for judging whether the extracted contour point is a true contour point or a noise based on the presence or absence of continuity of the coordinate values in the contour point extracted by the contour point extracting means, and extracting other contour candidate points in a portion judged as a noise based on coordinate values of a true contour point near the portion, and outputting them to the corresponding point detecting means and the three dimensional coordinates calculating means, and outputting the coordinate values of the contour points where there is no noise portion or noise portion has been corrected to the object display means, wherein the corresponding point detecting means leads a straight line including the corresponding points corresponding to the reference points, in other images than images that extract the reference points, by using parameters calculated by the parameter calculating means, searches for corresponding point candidates to be feature points having features on image, on the straight line, carries out a block matching processing on the searched above corresponding point candidate, and makes the corresponding point candidates as corresponding points at which an obtained block error is below a threshold value, and when contour point candidates are input from the noise correcting means, detects corresponding points on the basis of the contour point candidates, the three dimensional coordinates calculating means calculates three dimensional coordinates values of the contour point based on corresponding points of the contour point candidates detected by contour point candidate and the corresponding point detecting means, when contour point candidates are input from the noise correction means, and the object display means extracts an image of the object from images photographed by the image pickup means on the basis of coordinate values of the contour point input from the noise correction means.

In another preferred construction, the image processor further comprises a noise judging means for judging whether the contour point extracted based on the presence or absence of continuity of coordinate values in the contour point extracted by the contour point extracting means is a true contour point or a noise, a contour smoothing processing means for correcting the contour point that the noise judging means judges as a noise in consideration of the continuity with other contour points that are judged as true, and outputting it to the object display means, wherein the object display means extracts an image of the object from images photographed by the image pickup means on the basis of the coordinate values of the corrected contour point input from the contour smoothing processing means, and displays it on a display device.

In another preferred construction, the image processor further comprises a noise judging means for judging whether the contour point extracted based on the presence or absence of continuity of coordinate values in the contour point extracted by the contour point extracting means is a true contour point or a noise, a contour smoothing processing means for correcting the contour point that the noise judging means judges as a noise in assumption of the continuity with other contour points that are judged as true, and outputting it to the object display means, wherein the object display means extracts an image of the object from images photographed by the image pickup means based on the coordinate values of the corrected contour point input from the contour smoothing processing means, and displays it on a display device, the corresponding point detecting means leads a straight line including the corresponding points corresponding to the reference points, in other images than images that extract the reference points, by using parameters calculated by the parameter calculating means, searches for corresponding point candidates to be feature points having features on image, on the straight line, and carries out a block matching processing on the searched above corresponding point candidates, and makes the corresponding point candidates as corresponding points at which an obtained block error is below a threshold value.

Other objects, characteristics and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 7 is a block diagram showing a structure of a parameter calculating portion in the present preferred embodiment.

FIG. 10 is a diagram showing an image obtained by photographing an object.

DESCRIPTION OF THE PREFERRED EMBODIMENT

The preferred embodiment of the present invention will be discussed hereinafter in detail with reference to the accompanying drawings. In the following description, mathematical specific details are set forth in order to provide a thorough understanding of the present invention. It will be obvious, however, to those skilled in the art that the present invention may be practiced without these specific details. In other instance, well-known structures are not shown in detail in order not to unnecessarily obscure the present invention.

Figure 1:
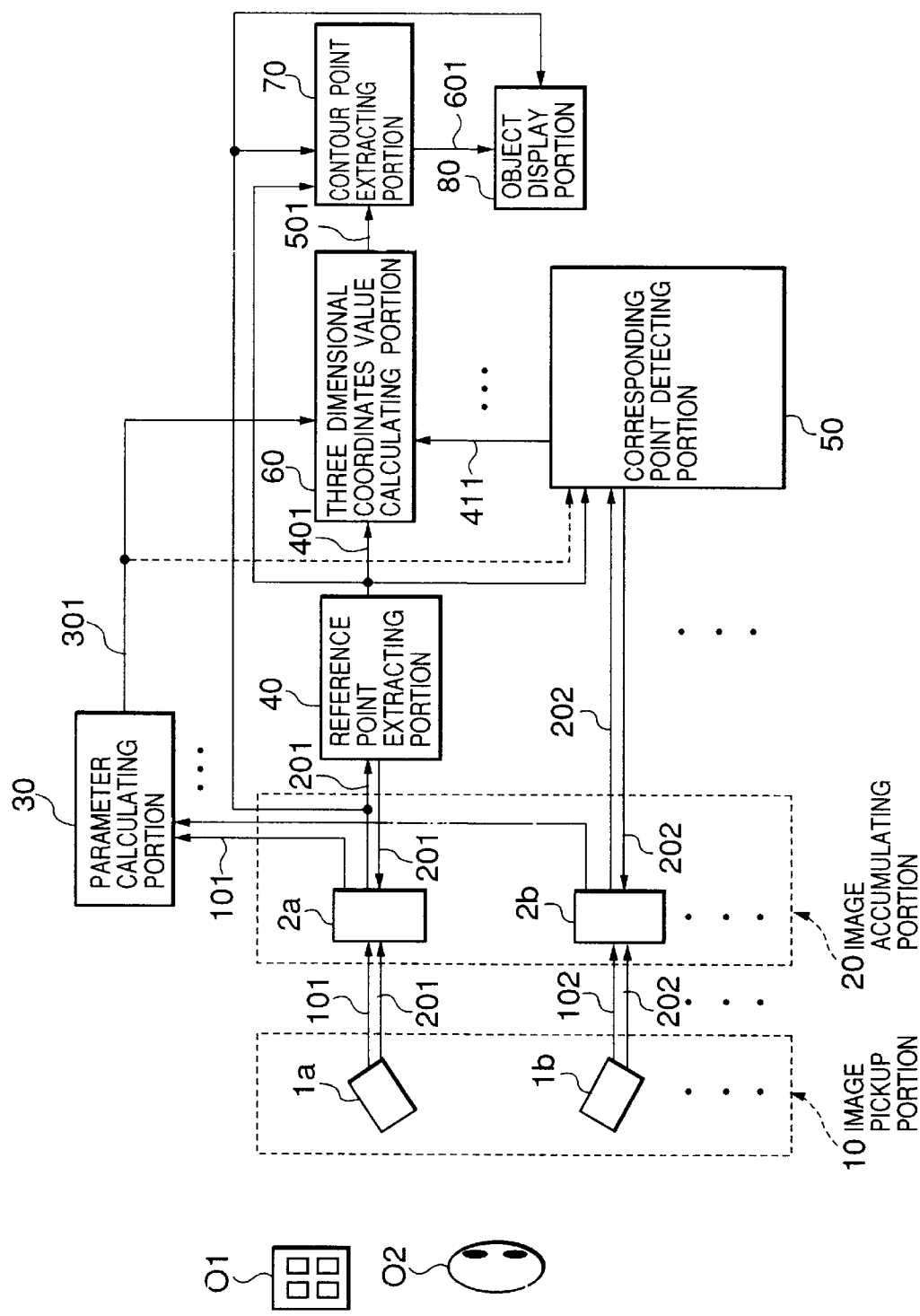
FIG. 1 is a block diagram showing a structure of an image processor in the first preferred embodiment according to the present invention.

FIG. 1 is a block diagram showing a structure of an image processor in the first preferred embodiment according to the present invention.

In reference to FIG. 1, an image processor in the first preferred embodiment comprises an image pickup portion 10 to take in an image of an object, an image accumulating portion 20 that accumulates images taken by the image pickup portion 10, a parameter calculating portion 30 that analyzes a solid in images where a well known pattern is painted (hereinafter referred to as "reference solid") and calculates parameters necessary for multi eye image processing, a reference point extracting portion 40 that extracts a reference point to be used in object extraction from images taken by the image pickup portion 10, a corresponding point detecting portion 50 that detects a corresponding point in plural images taken by the image pickup portion 10 (hereinafter referred to as "corresponding point"), a three dimensional coordinates value calculating portion 60 that calculates a three dimensional coordinates value of an object in an image, a contour point extracting portion 70 that extracts a point to form a contour of an object in images (hereinafter referred to as "contour point"), and an object display control portion 80 that displays an image of the object portion extracted from input image. In FIG. 1, only a feature structure of the present preferred embodiment is described, and other general structures are omitted herein.

In the above structure, the image pickup portion 10 is structured wherein plural image pickup devices 1a, 1b, . . . are arranged so that each optical axis should have a convergent angle. And the image accumulating portion 20 is equipped with plural image accumulating device 2a, 2b, . . . that are arranged to correspond to image pickup devices 1a, 1b, . . . of the image pickup portion 10. Thereby, images taken by respective image pickup devices 1a, 1b, . . . of the image pickup portion 10 are accumulated in respective image accumulating devices 2a, 2b, . . . of the image accumulating portion 20 one by one. By the way, in the explanation hereafter, it is supposed for simple understanding that the image pickup portion 10 has two units of image pickup devices 1a and 1b and the image accumulating portion 20 has two units of image accumulating devices 2a and 2b.

The parameter calculating portion 30, as shown in FIG. 7 comprises image buffers 31a and 31b that read and temporarily store image data from respective image accumulating devices 2a and 2b of the image accumulating portion 20, a calculating portion 32 that calculates necessary parameter 301 by using the image data stored in the image buffers 31a and 31b, and a parameter holding portion 33 that stores and holds the calculated parameter 301. By the way, it is needless to say that the image buffers 31a and 31b are arranged according to the number of image accumulating devices that structure the image accumulating portion 20 and the image pickup devices that structure the image pickup portion 10.

The reference point extracting portion 40 is realized by a program controlled CPU and RAM and other internal memories, and reads the images obtained by one unit of an image pickup device 1a of the image pickup portion 10 from a corresponding image accumulating device 2a of an image accumulating portion 20, and extracts a reference point to extract an image of an object from the whole images, and calculates its coordinate value 401. Herein, a reference point is a point where the color and brightness in image are conspicuously different from ambient pixels. Such a point is referred to as a feature point in the present preferred embodiment in general, and the feature point extracted by the reference point extracting portion 40 is especially referred to as a reference point. As for the extraction of a reference point (feature point), those methods conventionally used for the search of this kind of feature point, for example, those search methods by using the distributed values of ambient pixels, a Sobel filter and a Rapratian filter often used in image processing and so forth may be employed.

The corresponding point detecting portion 50 is realized by a program controlled CPU and RAM and other internal memories, and reads the images obtained by other image pickup device (image pickup device 1b in this case) than the image pickup device 1a in the image pickup portion 10 from a corresponding image accumulating device (image accumulating device 2b in this case) in the image accumulating portion 20, and detects a reference point corresponding to a reference point extracted by reference point extracting corresponding point portion 40 by the parameter 301 calculated by the parameter calculating portion 30 and the coordinate value 401 of the reference point calculated by the reference point extracting portion 40, and calculates its coordinate value 411.

The three dimensional coordinates calculating portion 60 is realized by a program controlled CPU and RAM and other internal memories, and calculates a coordinate value 501 of a point in three dimensional space shown as a reference pointer a corresponding point on image (hereinafter referred to as a three dimensional coordinates value 501) by using the parameter 301 calculated by the calculating portion 30, a coordinate value 401 of the reference point calculated by the reference point extracting portion 40 and the coordinate value 411 of the corresponding point calculated by the corresponding point detecting portion 50.

The contour point extracting portion 70 is realized by a program controlled CPU and RAM and other internal memories, and by using the coordinate value 401 of the reference point calculated by the reference point extracting portion 40 and the three dimensional coordinates value 501 calculated by the three dimensional coordinates calculating portion 60, it extracts an object contour point of a desired object among images taken by the image pickup device 1a of the image pickup portion 10, and calculates its coordinate value 601. Herein, an object contour point means a point to be obtained in the following. Namely, first in the images taken by the image pickup device 1a of the image pickup portion 10, among all the reference points extracted by the reference point extracting portion 40, those reference points that do not form the contour of an object clearly are removed. And among the respective remaining reference points, the leftest reference point in all the reference points positioned on the horizontal line including the reference point and the rightest reference point are extracted as object contour points.

The object display control portion 80 is realized by a program controlled CPU and RAM and other internal memories, and extracts only the portion between the object contour points extracted by the contour point extracting portion 70, in unit of horizontal line, out of images taken by image pickup device 1a of the image pickup portion 10, and displays it on CRT or LCD or other display device.

In the next place, the actions of the present preferred embodiment are explained hereinafter.

The actions of the present preferred embodiment are largely divided into actions to take in the parameter 301 by using the image of a reference solid where well known pattern is painted, and actions to extract an image of an object from images including a target object by using the parameter 301 that is obtained by the above actions. First explained are the actions to take the parameter 301.

Figure 5:
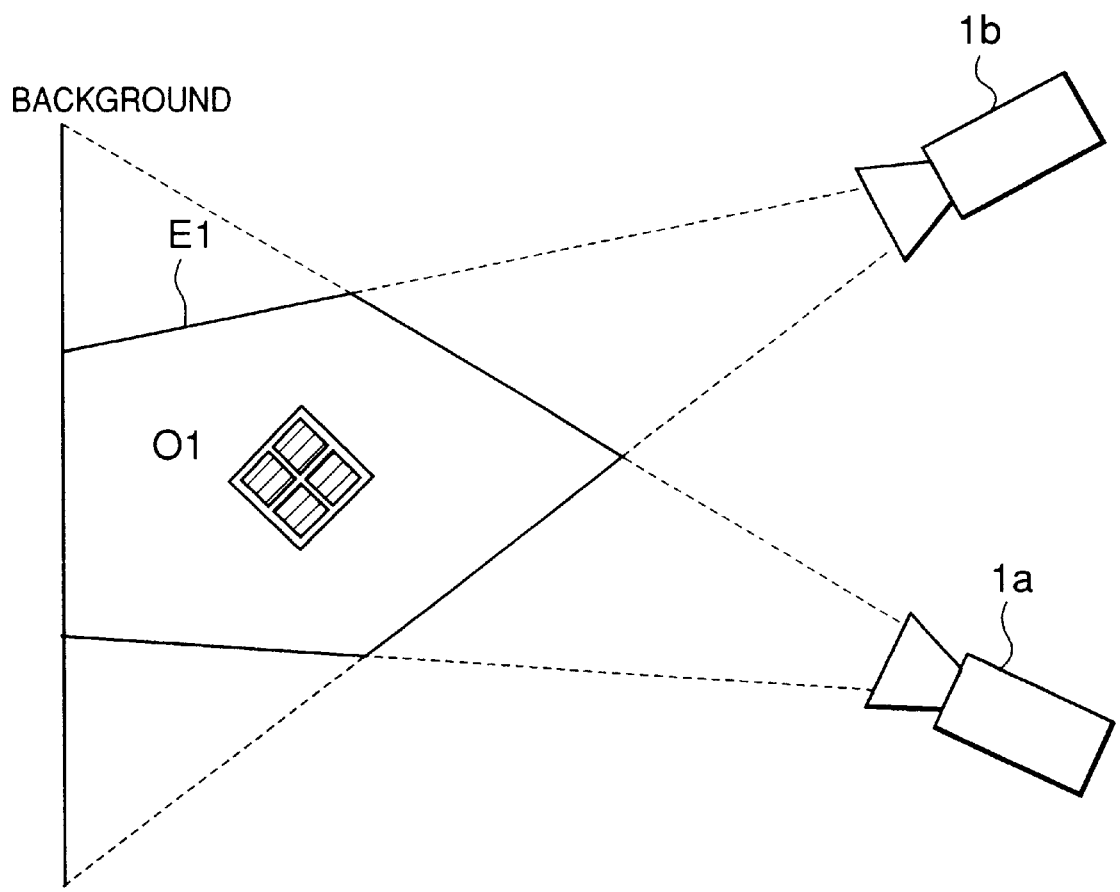
FIG. 5 is a diagram showing a camera arrangement for calculating parameters.
Figure 6:
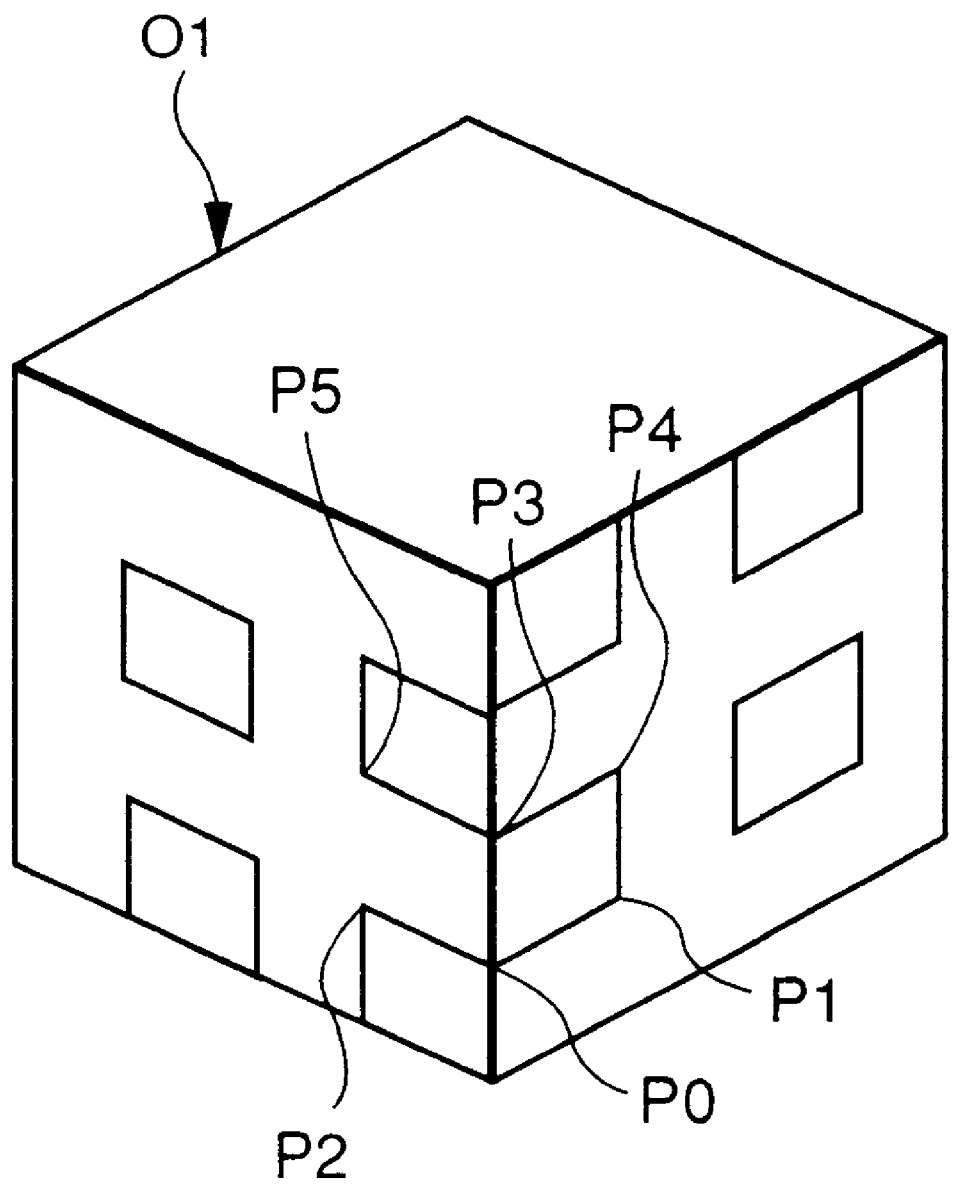
FIG. 6 is a diagram showing a reference solid where well known pattern is painted.

FIG. 5 is a schematic diagram showing an arrangement of an image pickup device for parameter calculation. In reference to FIG. 5, the two image pickup devices 1a and 1b in the image pickup portion 10 are arranged so that the respective optical axes should have convergent angles. By this arrangement, the area E1 that is positioned at the center of the screen photographed by the image pickup devices 1a and 1b is limited. A reference solid O1 as shown in FIG. 6 is arranged in this area E1 that is positioned at the center of the screen photographed by the image pickup devices 1a and 1b, and the reference solid O1 is taken in by these two image pickup devices 1a and 1b.

Figure 8B:
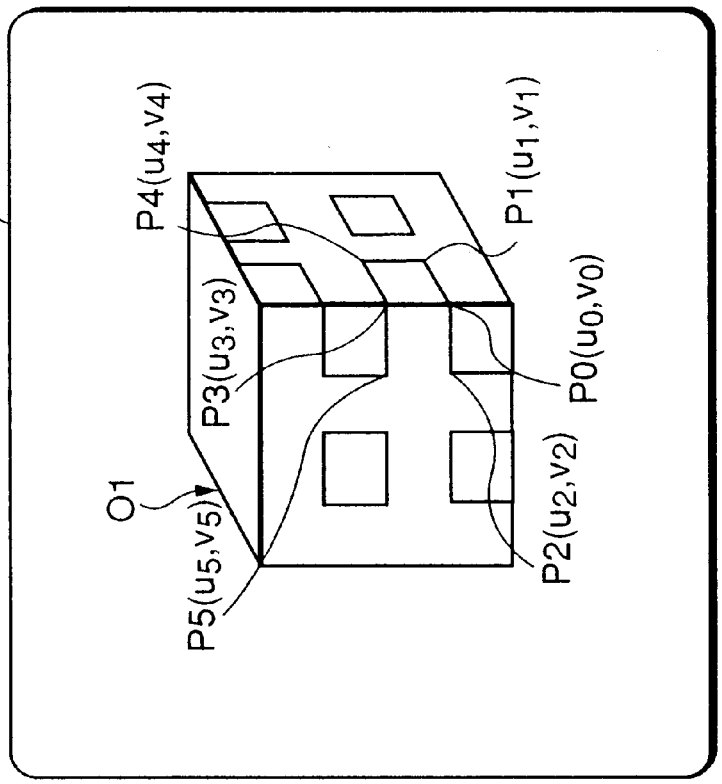
FIG. 8 is a diagram showing images obtained by photographing a reference solid.
Figure 8A:
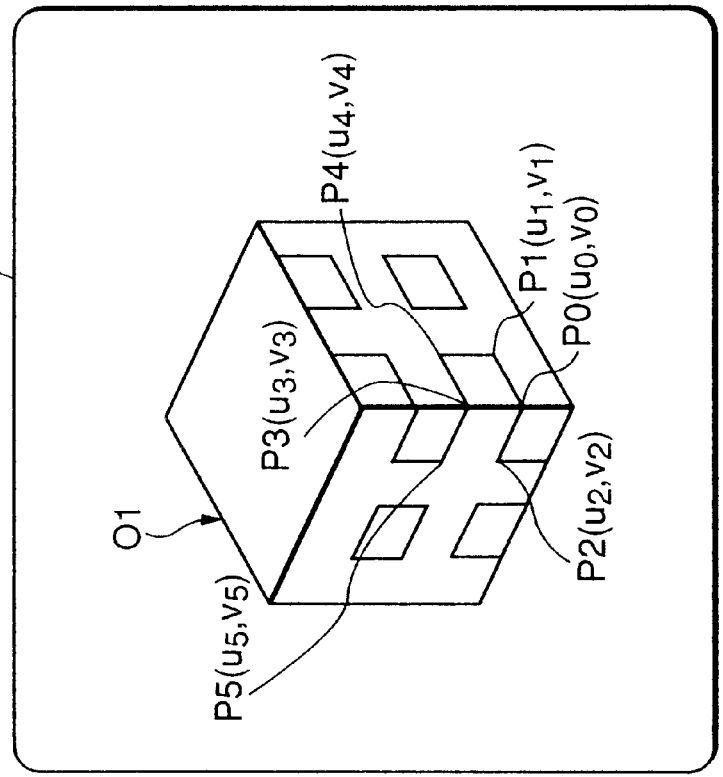

The image data of the reference solid O1 taken by these two image pickup devices 1a and 1b, are stored once into image accumulating devices 2a and 2b respectively as image data 101 and 102 as shown in FIG. 1, and then sent to the parameter calculating portion 30. FIG. 8 (A) and FIG. 8 (B) shows images based on the image data 101 and 102 respectively of the reference solid O1 (Refer to FIG. 6.) taken by the image pickup devices 1a and 1b. The image data 101 and 102 sent to the parameter calculating portion 30 are temporarily stored in the image buffers 31a and 31b.

And as shown in FIG. 8 (A) and FIG. 8 (B), six feature points or more P0, P1, P2, P3, P4, P5 . . . that are scattered on some planes on the reference solid O1 are extracted by the calculating portion 32 of the parameter calculating portion 30, and their coordinate values are calculated.

Herein, a feature point means a point where color and brightness in image are conspicuously different from ambient pixels, as defined in the explanation of the above reference point. However, the feature point to be extracted by the calculating portion 32 is a feature for calculating the parameter 301, and is different from the reference point. The extracting method of a feature point is not specifically designated, and for example, an operator may designate a feature point in reference to images based on the image data 101 and 102 accumulated in the image buffers 31a and 31b in a screen of a display device, or may automatically extract it by image processing such as pattern matching and so on.

In the reference solid O1, as shown in FIG. 6, a three dimensional coordinates system, for example, with P0 as an original point (0, 0, 0), P1 as (1, 0, 0), P2 as (0, 1, 0), and P3 as (0, 0, 1), is determined, and it is supposed that P4 has a coordinate value ($\alpha 4$, $\beta 4$, $\gamma 4$) in this coordinate system, and P5 has a coordinate value ($\alpha 5$, $\beta 5$, $\gamma 5$). And as shown in FIG. 8 (A) and FIG. 8 (B), each coordinate value of the feature point P0, P1, P2, P3, P4, and P5 in the image data 101 are set as (uli, vli) (i=0, 1, 2, 3, 4, 5), and each coordinate value of the feature point P0, P1, P2, P3, P4, and P5 in the image data 102 are set as (uri, vri) (i=0, 1, 2, 3, 4, 5).

Next, the calculating portion 32, based on the values (uli, vli) and ($\alpha k$, $\beta k$, $\gamma k$) (k=4, 5), leads the following equations (1), (2), (3), and (4) with the parameter clj (j=0, 1, 2, 3) to represent the posture of the image pickup device 1a as a variable:

$$\{\alpha 4(ul4-ul1)\}cl1+\{\beta 4(ul4-ul2)\}cl2+\{\gamma 4(ul4-ul3)\}cl3=(1-\alpha 4-\beta 4-\gamma 4)(ul0-ul4) \quad (1)$$

$$\{\alpha 4(vl4-vl1)\}cl1+\{\beta 4(vl4-vl2)\}cl2+\{\gamma 4(vl4-vl3)\}cl3=(1-\alpha 4-\beta 4-\gamma 4)(vl0-vl4) \quad (2)$$

$$\{\alpha 5(ul5-ul1)\}cl1+\{\beta 5(ul5-ul2)\}cl2+\{\gamma 5(ul5-ul3)\}cl3=(1-\alpha 5-\beta 5-\gamma 5)(ul0-ul5) \quad (3)$$

$$\{\alpha 5(vl5-vl1)\}cl1+\{\beta 5(vl5-vl2)\}cl2+\{\gamma 5(vl5-vl3)\}cl3=(1-\alpha 5-\beta 5-\gamma 5)(vl0-vl5) \quad (4)$$

From the above four equations (1), (2), (3), and (4), clj (j=0, 1, 2, 3) is calculated by using, for example the least square method.

Then, the calculating portion 32, on the basis of the values (uri, vri) and ($\alpha k$, $\beta k$, $\gamma k$) (k=4, 5), leads the following equations (5), (6), (7), and (8) with the parameter crj (j=0, 1, 2, 3) to represent the posture of the image pickup device 1b as a variable:

$$\{\alpha 4(ur4-ur1)\}cr1+\{\beta 4(ur4-ur2)\}cr2+\{\gamma 4(ur4-ur3)\}cr3=(1-\alpha 4-\beta 4-\gamma 4)(ur0-ur4) \quad (5)$$

$$\{\alpha 4(vr4-vr1)\}cr1+\{\beta 4(vr4-vr2)\}cr2+\{\gamma 4(vr4-vr3)\}cr3=(1-\alpha 4-\beta 4-\gamma 4)(vr0-vr4) \quad (6)$$

$$\{\alpha 5(ur5-ur1)\}cr1+\{\beta 5(ur5-ur2)\}cr2+\{\gamma 5(ur5-ur3)\}cr3=(1-\alpha 5-\beta 5-\gamma 5)(ur0-ur5) \quad (7)$$

$$\{\alpha 5(vr5-vr1)\}cr1+\{\beta 5(vr5-vr2)\}cr2+\{\gamma 5(vr5-vr3)\}cr3=(1-\alpha 5-\beta 5-\gamma 5)(vr0-vr5) \quad (8)$$

From the above four equations (5), (6), (7), and (8), in the same manner as in the case of clj,crj (j=0, 1, 2, 3) is calculated by using, for example the least square method.

The (uli, vli), (uri, vri) (i=0, 1, 2, 3) and clj and cli (i=0, 1, 2, 3) created by the calculating portion 32 are stored into a parameter holding portion 33 as the parameter 301. And the actions to take in the parameter 301 are complete.

Figure 9:
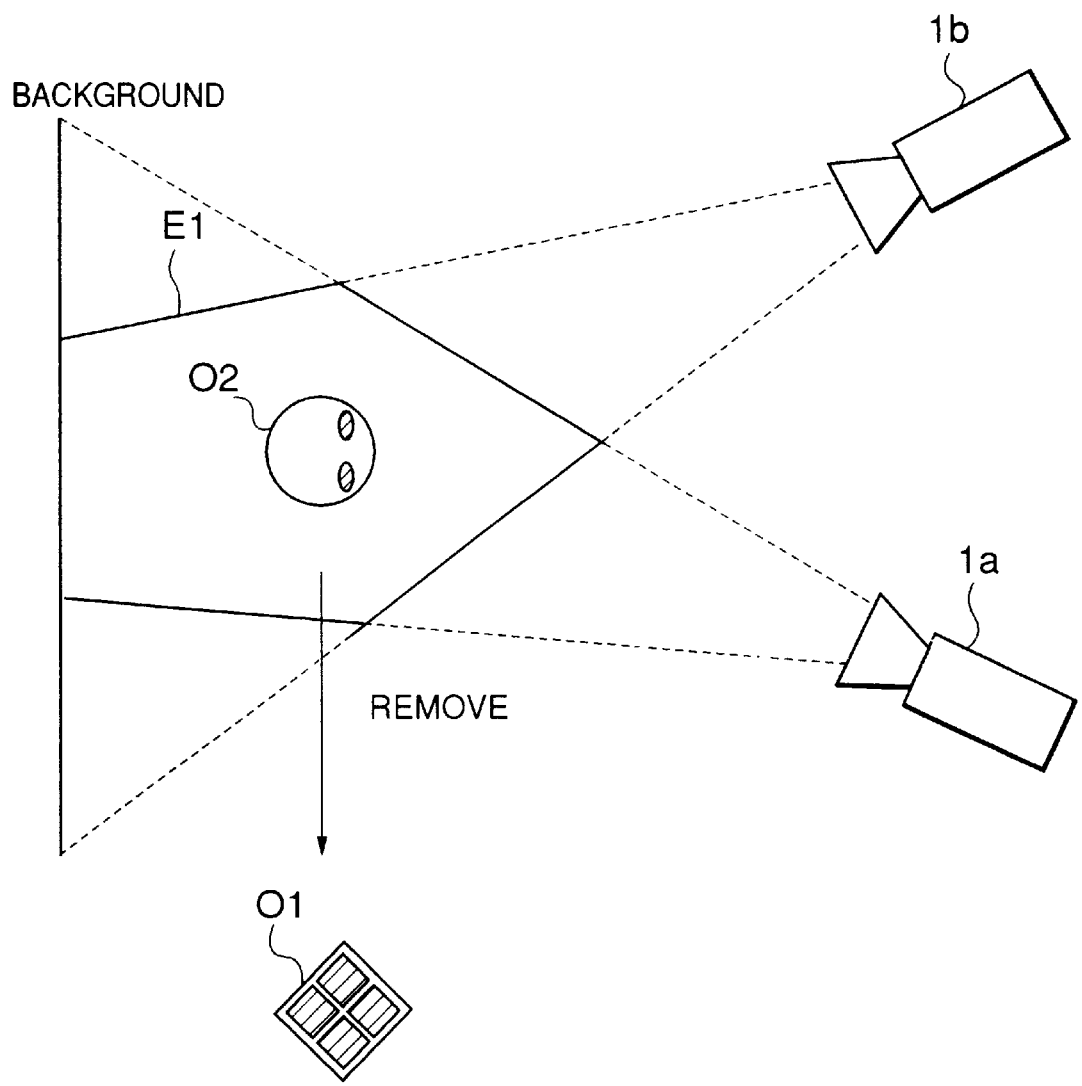
FIG. 9 is a diagram showing a camera arrangement for extracting an object.

After the parameter 301 is stored in the parameter holding portion 33, as shown in FIG. 9, the reference solid O1 where well known pattern is painted is removed from the area E1 that is projected at the center of the screen taken by the image pickup devices 1a and 1b, and the image pickup devices 1a and 1b are fixed, and a target object O2 is placed on the area E1. And the actions to extract an image of the object O2 are carried out. Instead of removing the reference solid O1 and placing the object O2, actions to extract the object O2 may be started by keeping the relative position relation of the image pickup devices 1a and 1b, moving the image pickup portion 10 and the image accumulating portion 20 to other place, and positioning the target object O2 in the area E1 to the image pickup devices 1a and 1b.

FIG. 10 (A) and FIG. 10 (B) show images based on the image data 201 and 202 of the object O2 taken by the image pickup devices 1a and 1b. The image data 201 and 202 of the object O2 taken by the image pickup devices 1a and 1b are stored into the image accumulating devices 2a and 2b respectively. As shown in FIG. 10, in the images based on the image data 201 and 202, the object O2 in each image is positioned at the center. Herein, as shown in FIG. 10 (A) and FIG. 10 (B), a horizontal coordinate axis and a vertical coordinate axis are set based on the image data 201 and 202, and the coordinate values of optional positions in image based on the image data 201 are called ul, vl coordinate values, while the coordinate values of optional positions in image based on the image data 202 are called ur, vr coordinate values.

In the next place, by the processing of the reference point extracting portion 40, a reference point is extracted from the image based on the image data 201. Namely, first, a search horizontal line in parallel with the horizontal coordinate axis that is set on image is set one by one from the top of image. And a reference point 232 to be a feature point on each search horizontal line is searched. The extracted coordinate value 401 of the reference point 232 is output to the corresponding point detecting portion 50 and the three dimensional coordinates calculating portion 60.

In the next place, by the processing of the corresponding point detecting portion 50, a corresponding point to correspond to the reference point 232 is extracted from the images based on the image data 202. The corresponding point detecting portion 50 first leads Epipolar line when it receives the coordinate value 401 of the reference point 232 from the reference point extracting portion 40. This is because the position of the corresponding point is specified on Epipolar line that is a specific straight line determined by the position relation of the image pickup devices 1a and 1b.

To lead the Epipolar line, data about the relative position relation of the image pickup devices 1a and 1b is necessary, but it may be led by using the parameter 301 that is stored in the parameter accumulating portion 33 of the parameter calculating portion 30. Namely, the Epipolar line including corresponding points (ur, vr) to correspond to the reference points (ul, vl) on the image data 201, $$vr = m \cdot ur + n$$

is calculated by the following equations using (uli, vli), (uri, vri) (i=0, 1, 2, 3), and clj, crj (j=0, 1, 2, 3) of the parameter 301.

In the first place, parameter (uli, vli) (i=0, 1, 2, 3) and clj (j=0, 1, 2, 3) and (ul, vl) are used, and a primary intermediate parameters t11, t12, t13, t21, t22, t23, d1, d2 are led from the following equations (9)~(16).

$$t11 = \{cl1(ul-ul1)-(ul-ul0)\} \tag{9}$$

$$t12 = \{cl2(ul-ul2)-(ul-ul0)\} \tag{10}$$

$$t13 = \{cl3(ul-ul3)-(ul-ul0)\} \tag{11}$$

$$t21 = \{cl1(vl-vl1)-(vl-vl0)\} \tag{12}$$

$$t22 = \{cl2(vl-vl2)-(vl-vl0)\} \tag{13}$$

$$t23 = \{cl3(vl-vl3)-(vl-vl0)\} \tag{14}$$

$$d1 = ul0 - ul \tag{15}$$

$$d2 = vl0 - vl \tag{16}$$

And in the next place, by using the primary intermediate parameters obtained by the above equations, t11, t12, t13, t21, t22, t23, d1, d2 and parameters (uri, vri)(i=0, 1, 2, 3), crj(i=0, 1, 2, 3), the secondary intermediate parameters, U0, U1, V0, V1, S0, S1 are led from the following equations (17)~(22).

$$U0 = ur0(t11 \cdot t22 - t12 \cdot t21) + (cr1 - ur1 - ur0)(t22 \cdot d1 - t12 \cdot d2) + (cr2 \cdot ur2 - ur0)(t11 \cdot d2 - t21 \cdot d1) \tag{17}$$

$$U1 = (cr1 \cdot ur1 - ur0)(t12 \cdot t23 - t13 \cdot t22) + (cr2 \cdot ur2 - ur0)(t13 \cdot t21 - t11 \cdot t23) + (cr3 \cdot ur3 - ur0)(t11 \cdot t22 - t12 \cdot t21) \tag{18}$$

$$U0 = vr0(t11 \cdot t22 - t12 \cdot t21) + (cr1 \cdot vr1 - vr0)(t22 \cdot d1 - t12 \cdot d2) + (cr2 \cdot vr2 - vr0)(t11 \cdot d2 - t21 \cdot d1) \tag{19}$$

$$U1 = (cr1 \cdot vr1 - vr0)(t12 \cdot t23 - t13 \cdot t22) + (cr2 \cdot vr2 - vr0)(t13 \cdot t21 - t11 \cdot t23) + (cr3 \cdot vr3 - vr0)(t11 \cdot t22 - t12 \cdot t21) \tag{20}$$

$$S0 = (t11 \cdot t22 - t12 \cdot t21) + (cr1 - 1)(t22 \cdot d1 - t12 \cdot d2) + (cr2 - 1)(t11 \cdot d2 - t21 \cdot d1) \tag{21}$$

$$S1 = (cr1 - 1)(t12 \cdot t23 - t13 \cdot t22) + (cr2 - 1)(t13 \cdot t21 - t11 \cdot t23) + (cr3 - 1)(t11 \cdot t22 - t12 \cdot t21) \tag{22}$$

In the next place, by using the secondary intermediate parameters obtained by the above equations, U0, U1, V0, V1, S0, S1, the inclination m and vr cut piece n of the Epipolar line including the corresponding points (ur, vr) on the image data 201, $$vr = m \cdot ur + n$$

are led from the following equations (23) and (24).

$$m = \frac{S1 \cdot V0 - S0 \cdot V1}{S1 \cdot U0 - S0 \cdot U1} \tag{23}$$

$$m = \frac{U0 \cdot V1 - U1 \cdot V0}{S1 \cdot U0 - S0 \cdot U1} \tag{24}$$

After the Epipolar line 233 is led to correspond to the reference point 232, a corresponding point is searched on the obtained Epipolar line 233. At this moment, when the reference point 232 is at the left side from the image center line 231a (Refer to FIG. 10 (A).) of the image data 201, search is made from the image center line 231b (Refer to FIG. 10 (B).) of the image data 202 to the left until the feature points (ur, vr) are found. In the same way, when the reference point 232 is at the right from the image center line 231a of the image data 201, search is made from the image center line 231*b* of the image data 202 to the right until the feature points (ur, vr) are found out. The feature points (ur, vr) detected in this search are called corresponding point candidate 234.

Figure 11:
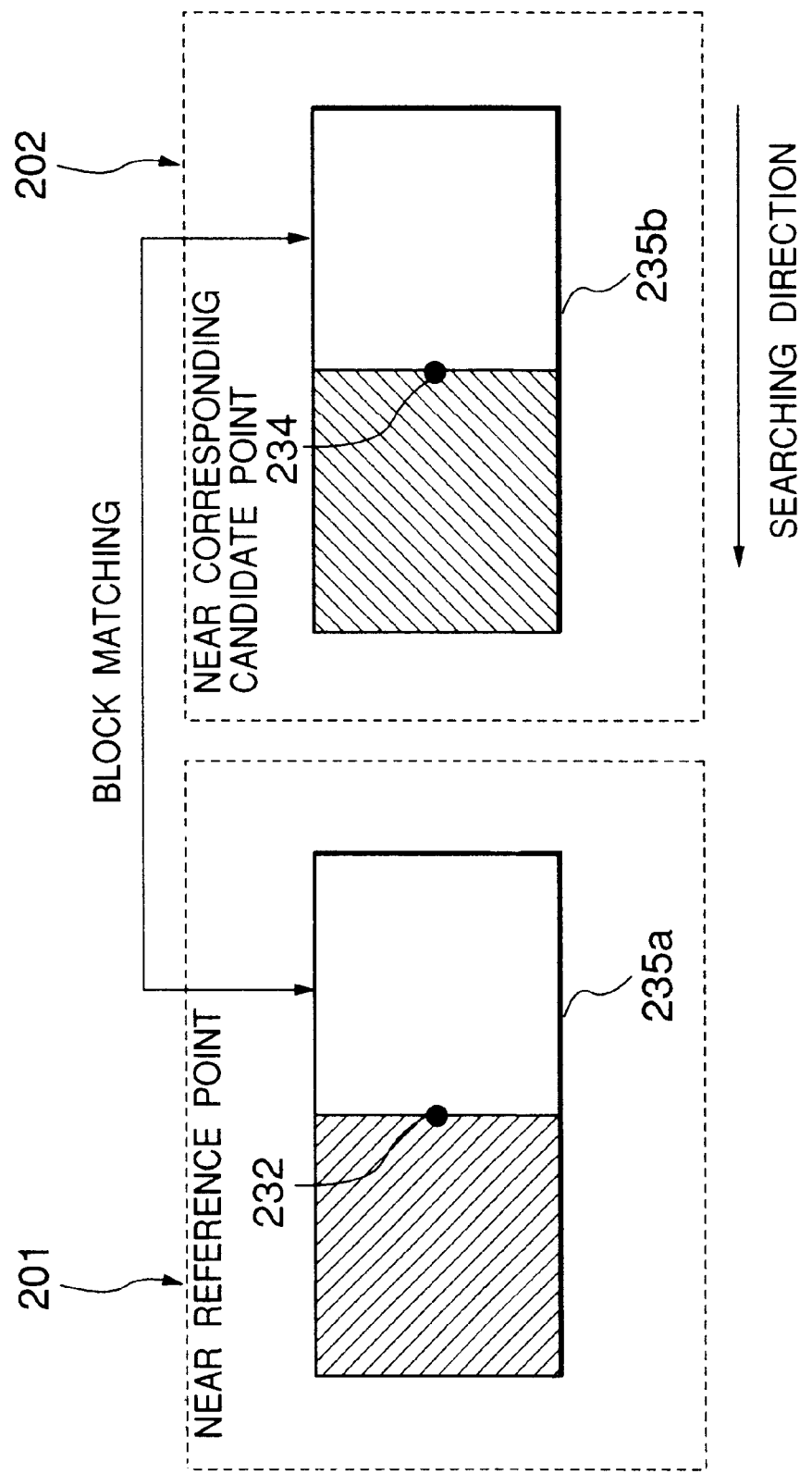
FIG. 11 is a schematic diagram showing a block matching.

In the above manner, after the corresponding point candidate 234 (ur, vr) is detected, block error is calculated by block matching. Block matching is a processing to calculate the absolute value or the sum of the square by, for example, when the reference point 232 is at the left side from the image center line 231*a* of the image data 201, as shown in FIG. 11, by setting specific areas block 235*a* and block 235*b* at the right side of the reference point 232 and the corresponding point candidate 234 respectively, and seeking for the difference in color or brightness in coordinate positions between the block 235*a* and the block 235*b*. The value to be obtained by this processing is a block error value. By the way, when the reference point 232 is at the right side from the image center line 231*a* of the image data 201, in the same manner, blocks are set at the left side of the reference point 232 and the corresponding point candidate 234 respectively, and the block error is calculated.

After the block error is calculated in the above manner, a specified threshold value and the block error are compared with each other, and if the block error is larger than the threshold value, then the processing goes back to the edge point search on the above Epipolar line. A threshold value may be set in advance and stored in the internal memory of the corresponding point detecting portion 50, and also it may be input from the outside.

On the other hand, if the block error is smaller than the threshold value, the corresponding point candidate 234 is determined as a corresponding point, and its coordinate value 402 is input to the three dimensional coordinates calculating portion 60.

In the next place, by using the processing of the three dimensional coordinates calculating portion 60, the three dimensional coordinate value 501 of a point on an object as a projection source is calculated. In the calculation of the three dimensional coordinates value 501, used are the parameter 301, that is, (uli, vli), (uri, vri) (i=0, 1, 2, 3), and clj,crj (j=0, 1, 2, 3), and the coordinate value 401 of the reference point 232, that is, (ul,vl), and the coordinate value 402 of its corresponding point, that is, (ur, vr). As the method to calculate the three dimensional coordinates value 501, various methods that are conventionally used widely may be employed, and for example, the following method may be used.

Namely, by using the parameters (uli, vli), (uri, vri)(i=0, 1, 2, 3) and clj,crj(j=0, 1, 2, 3), the following simultaneous equations (25)–(28) with solution of the three dimensional coordinates value 501($\alpha$, $\beta$, $\gamma$) of the projection source are led:

$$\{cl1(ul-ul1)-(ul-ul0)\}\alpha+\{cl2(ul-ul2)-(ul-ul0)\}\beta+\{cl3(ul-ul3)-(ul-ul0)\}\gamma=ul0-1 \qquad (25)$$

$$\{cl1(vl-vl1)-(vl-vl0)\}\alpha+\{cl2(vl-vl2)-(vl-vl0)\}\beta+\{cl3(vl-vl3)-(vl-vl0)\}\gamma=vl0-1 \qquad (26)$$

$$\{cr1(ur-ur1)-(ur-ur0)\}\alpha+\{cr2(ur-ur2)-(ur-ur0)\}\beta+\{cr3(ur-ur3)-(ur-ur0)\}\gamma=ur0-r \qquad (27)$$

$$\{cr1(vr-vr1)-(vr-vr0)\}\alpha+\{cr2(vr-vr2)-(vr-vr0)\}\beta+\{cr3(vr-vr3)-(vr-vr0)\}\gamma=vr0-r \qquad (28)$$

By the least square method with the above equations (25), (26), (27), (28), the three dimensional coordinates value 501 ($\alpha$, $\beta$, $\gamma$) of a point on an object as a projection source is calculated. The calculated three dimensional coordinates value 501 ($\alpha$, $\beta$, $\gamma$) of a point on the object is output to the contour point extracting portion 70.

In the next place, by using the processing of the contour point extracting portion 70, an object contour point to form contour of an object in an image is extracted from images based on the image data 201. First, among the images based on the image data 201, feature points having coordinate value 401 input from reference point extracting portion 40 are marked. And among the marked points, the area where the three dimensional coordinates value 501 is clearly inappropriate as a contour point is excluded. By the way the judgment criteria of the area where the three dimensional coordinates value 501 is clearly inappropriate as a contour point is predetermined, and may be stored in the internal memory in the contour point extracting portion 70 or it may be designated by input from the outside. After then, among the remaining marked points, points that are on an identical horizontal line are investigated, and the leftest point and the rightest one are extracted as object contour points, and their coordinate value 601 is output to the object display control portion 80.

In the next place, by the object display control portion 80, image of an object in images based on the image data 201 is extracted, and displayed on a display device. Namely, among the images based on the image data 201, in unit of the horizontal line that was used in extraction of object contour point by the contour point extracting portion 70, only the portion between the right and left object contour points indicated by the coordinate value 601 is extracted as an object in an image, and the extracted image data is sent to the display device.

As explained above, according an image processor of the present preferred embodiment, when an object in an image is extracted from images obtained by plural image pickup devices, a three dimensional coordinates value in a feature point (reference point) of the image is calculated, and an object image is extracted by using the three dimensional coordinates value, it is easy to determine the threshold value to decide an area of extraction as an object image.

And since a desired feature point is extracted from images by using the parameter obtained in photographing of a reference solid where well known pattern is painted, and the three dimensional coordinates value is calculated too, there is no need to adjust the position and posture of the image pickup devices.

Figure 2:
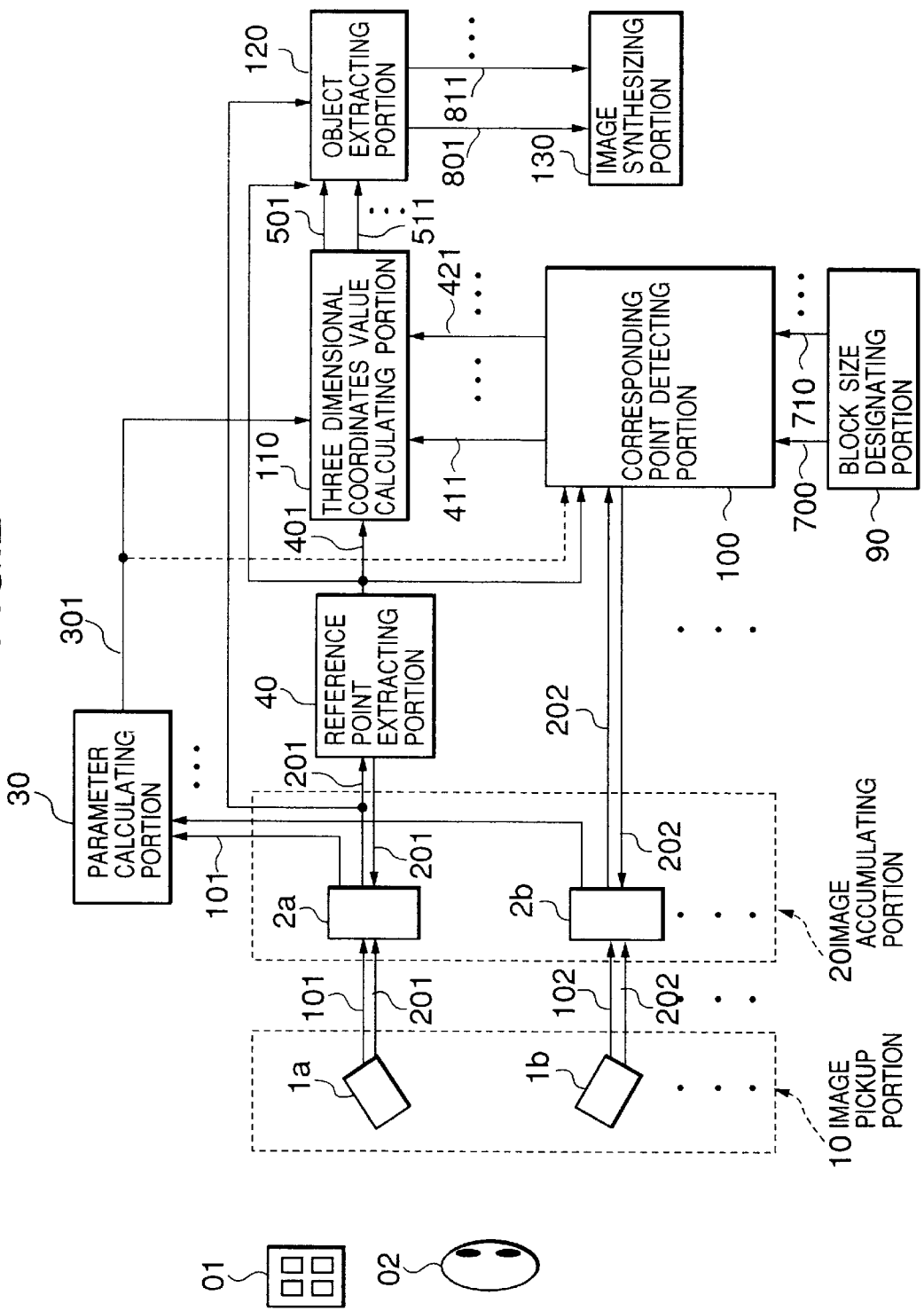
FIG. 2 is a block diagram showing a structure of an image processor in the second preferred embodiment according to the present invention.

FIG. 2 is a block diagram showing a structure of an image processor in the second preferred embodiment according to the present invention.

In reference to FIG. 2, in the same manner as in the first preferred embodiment shown in FIG. 1, an image processor in the second preferred embodiment comprises an image pickup portion 10 to take in an image of an object, an image accumulating portion 20 that accumulates images taken by the image pickup portion 10, a parameter calculating portion 30 that analyzes images of a reference solid and calculates parameters necessary for multi eye image processing, a reference point extracting portion 40 that extracts a reference point to be used in object extraction from images captured by the image pickup portion 10, a corresponding point detecting portion 100 that detects corresponding points in plural images taken by the image pickup portion 10, a three dimensional coordinates value calculating portion 110 that calculates the three dimensional coordinates value of an object in images, an object extracting portion 120 that extracts contour points of an object in images and creates plural images of an object portion extracted from input images, an image synthesizing portion 130 that synthesizes and displays plural images of the object portion created by the object extracting portion 120, and a block size designating portion 90 that designates the block size to be used in block matching that is executed in the detecting processing of corresponding points by the corresponding point detecting portion 100. By the way, in FIG. 2, only a feature structure of the present preferred embodiment is described, and other general structures are omitted herein.

In the above structure, the image pickup portion 10, the image accumulating portion 20, the parameter calculating portion 30 and the reference point extracting portion 40 are same as respective components with identical codes in the first preferred embodiment, therefore, their explanations are omitted herein. In the present preferred embodiment too, it is supposed for simplicity that the image pickup portion 10 has two units of image pickup devices 1a and 1b and the image accumulating portion 20 has two units of image accumulating devices 2a and 2b.

The block size designating portion 90 is realized by a program controlled CPU and RAM and other memories. And in the corresponding point detecting processing in the corresponding point detecting portion 100, when block matching is carried out to the feature point (reference point and corresponding point candidate) read from the respective image accumulating devices 2a and 2b of the image accumulating portion 20, the block size designating portion 90 designates plural block sizes to be set to respective feature points. The set block sizes 700, 710, . . . may be predetermined and stored in internal memory and be automatically designated at block matching by the corresponding point detecting portion 100, or may be designated by input from the outside.

With respect to the corresponding point detecting portion 100, the fundamental functions to detect corresponding points are same as those of the corresponding point detecting portion 50 in the first preferred embodiment. But, by using the plural block sizes 700, 710, . . . designated by the block size designating portion 90, coordinate values 411, 421, . . . of plural corresponding points per combination of respective reference points and corresponding point candidates are calculated and output.

With respect to the three dimensional coordinates calculating portion 110, the fundamental functions to calculate the three dimensional coordinates are same as those of the three dimensional coordinates calculating portion 60 in the first preferred embodiment. However, there are plural coordinate values 411, 421, . . . of the corresponding point received from the corresponding point; detecting portion 100 per reference point, according to the block matching using plural block sizes, plural three dimensional coordinates values 501, 511, . . . are calculated and displayed to respective reference points.

With respect to the object extracting portion 120, the fundamental functions to extract a contour point of object from image, and to create an object image are same as those of the contour point extracting portion 70 and the object display control portion 80 in the first preferred embodiment. However, in accordance with the plural three dimensional coordinates values 501, 511, . . . per feature point, input from the three dimensional coordinates calculating portion 110, plural object extracted image 801, 811, . . . are created and output.

Figure 12:
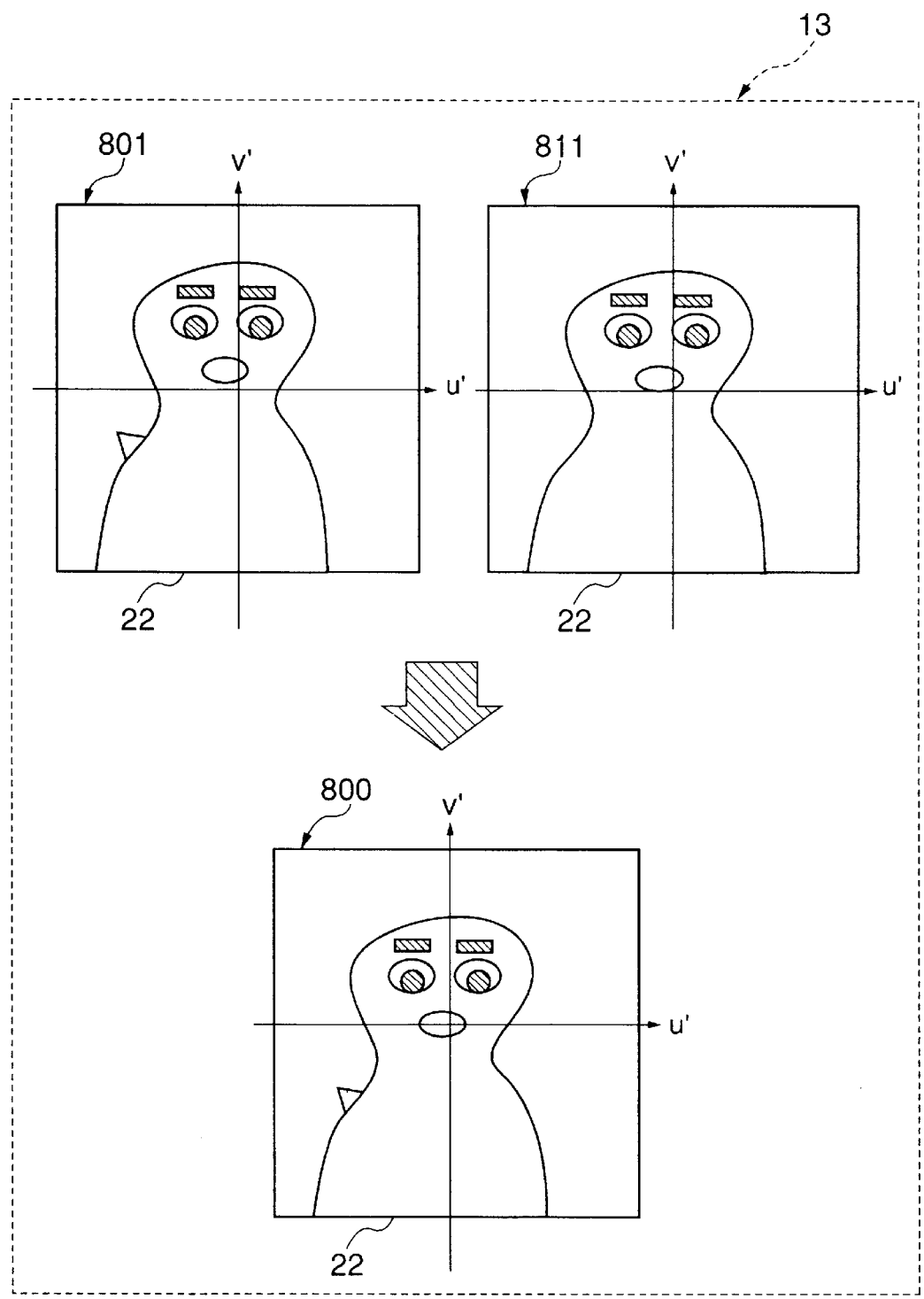
FIG. 12 is a schematic diagram showing an image synthetic processing.

The image synthesizing portion 130 synthesizes plural object extracted images 801, 811, . . . output from the object extracting portion 120, and displays them on the display device. Namely, as shown in FIG. 12, it takes a logical sum of object extracted images 801, 811, . . . and makes them into an image. In other words, in pixel level, elements extracted to any object extracted image are finally included in an object image.

As explained above, according an image processor of the present preferred embodiment, in addition to the effects attained by the first preferred embodiment hereunder, plural object images are extracted by using the results of a block matching by plural block sizes, and they are synthesized to create a target object image, therefore, it is possible to improve the precision of extraction, and to reduce noise in an object image.

Figure 3:
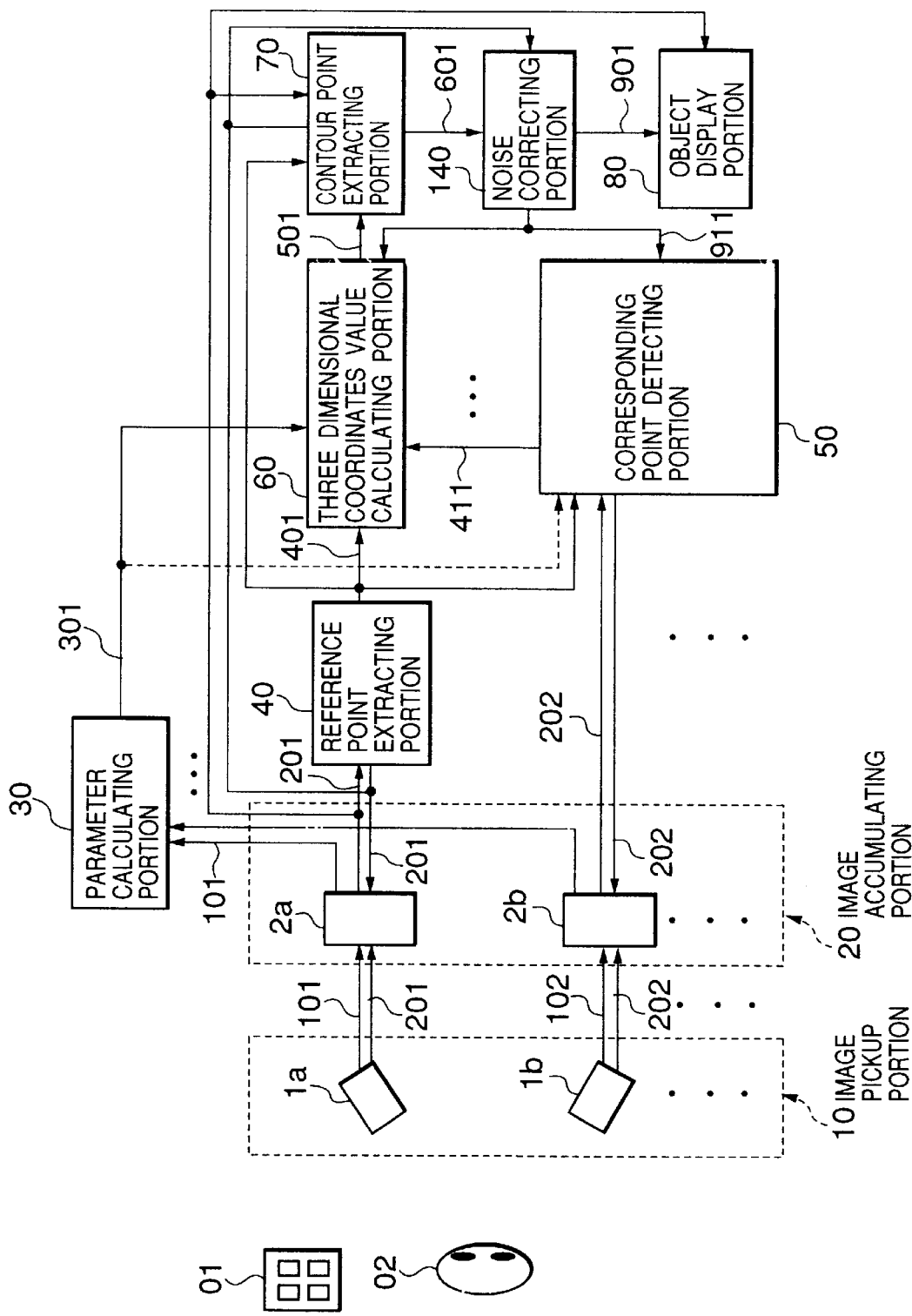
FIG. 3 is a block diagram showing a structure of an image processor in the third preferred embodiment according to the present invention.

FIG. 3 is a block diagram showing a structure of an image processor in the third preferred embodiment according to the present invention.

In reference to FIG. 3, in the same manner as in the first preferred embodiment shown in FIG. 1, an image processor in the first preferred embodiment comprises an image pickup portion 10 to take in an image of an object, an image accumulating portion 20 that accumulates images taken by the image pickup portion 10, a parameter calculating portion 30 that analyzes images of a reference solid and calculates parameters necessary for multiple image processing, a reference point extracting portion 40 that extracts a reference point to be used in object extraction from images captured by the image pickup portion 10, a corresponding point detecting portion 50 that detects a corresponding point in plural images captured by the image pickup portion 10, a three dimensional coordinates value calculating portion 60 that calculates a three dimensional coordinates value of an object in an image, a contour point extracting portion 70 that extracts a contour point to form a contour of an object in images, an object display control portion 80 that displays the object portion extracted from input image 80 in an image, and in addition, a noise correcting portion 140 that detects and corrects noise among the contour points extracted by the contour point extracting portion 70. In FIG. 3, only a feature structure of the present preferred embodiment is described, and other general structures are omitted herein.

In the above structure, the respective components except the noise correcting portion 140 are same as respective components with identical codes in the first preferred embodiment, therefore, their explanations are omitted herein. In the present preferred embodiment too, it is supposed for simple understanding that the image pickup portion 10 has two units of image pickup devices 1a and 1b and the image accumulating portion 20 has two units of image accumulating devices 2a and 2b.

The noise correcting portion 140 is realized by a program controlled CPU and RAM and other memories. And by using the coordinate value 601 of the object contour point output from the contour point extracting portion 70, it investigates the continuity of the contour, and judges whether the extracted object contour point is a true contour point or a noise. And if it judges that as a true contour point, it outputs the coordinates 901 of that object contour point to the object display control portion 80. On the other hand, if it judges that as a noise, it refers to an adjacent true object contour point, and makes other feature points in the image data 201 as object contour points, and outputs that coordinate value 911 to the corresponding point detecting portion 50 and the three dimensional coordinates calculating portion 60.

In reference to FIG. 13, the actions of the noise correcting portion 140 are explained in detail hereinafter.

Figure 13:
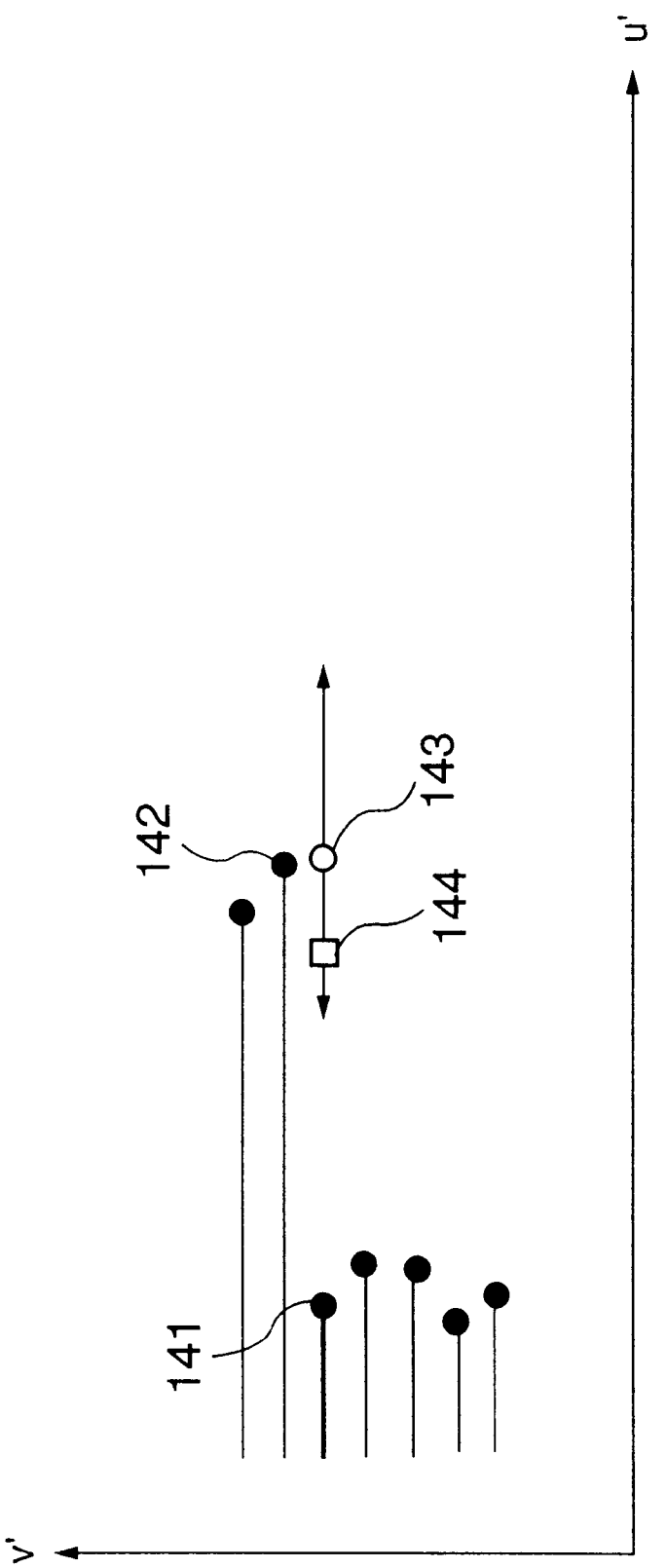
FIG. 13 is a diagram showing a search and correction processings of a contour discontinuous portion.

In reference to FIG. 13, the noise correcting portion 140 first scans the images based on the image data 201, from the top to the bottom in unit of horizontal line, and investigates the object contour point indicated by the coordinate value 601 (Refer to FIG. 3.), and searches for the points where continuity is conspicuously corrupted such as contour points 141 and 142. The judgment of this continuity is carried out by the comparison between a specified threshold value and the ul coordinate value of the contour points 141 and 142. The threshold value may be predetermined and stored in internal memory, or may be given by setting input from the outside.

At the event of detection of a discontinuous portion such as contour points 141 and 142, the contour point 141 is set as an attention contour point, and the contour point 142 is set as a comparative contour point. And the point on the same horizontal line as the attention contour point where the comparative contour point is same as the ul coordinate value is set as an reference contour point 143. And it searches for feature points on the same horizontal line as the reference contour point 143 in the same manner as the reference point extracting portion 40, and it sets the feature point nearest to the reference contour point 143 as contour point candidate 144, and outputs its coordinate value 911 to the corresponding point detecting portion 50 and the three dimensional coordinates calculating portion 60.

After the above processing, when the three dimensional coordinates values of contour point candidate 144 that are calculated by the corresponding point detecting portion 50 and the three dimensional coordinates calculating portion 60 are within the appropriate range as contour point by the judgment of the contour point extracting portion 70, it judges the contour point candidate 144 concerned as an true object contour point. If the contour point candidate 144 concerned is not within the appropriate range as contour point, it sets the original contour point 141 as a true object contour point.

Further after then, it scans the images based on the image data 201, from the bottom to the top in unit of horizontal line, and replaces the attention contour point with the comparative contour point, and the same processing is carried out. The coordinate value 901 of the contour point that is finally obtained by the above processing is output to the object display control portion 80.

As explained above, according to an image processor of the present preferred embodiment, in addition to the effects attained by the first preferred embodiment hereunder, since what is judged as noise among extracted object contour points is corrected into a true contour point, it is possible to improve the precision of object image extraction, and to obtain object images with small noise.

Figure 4:
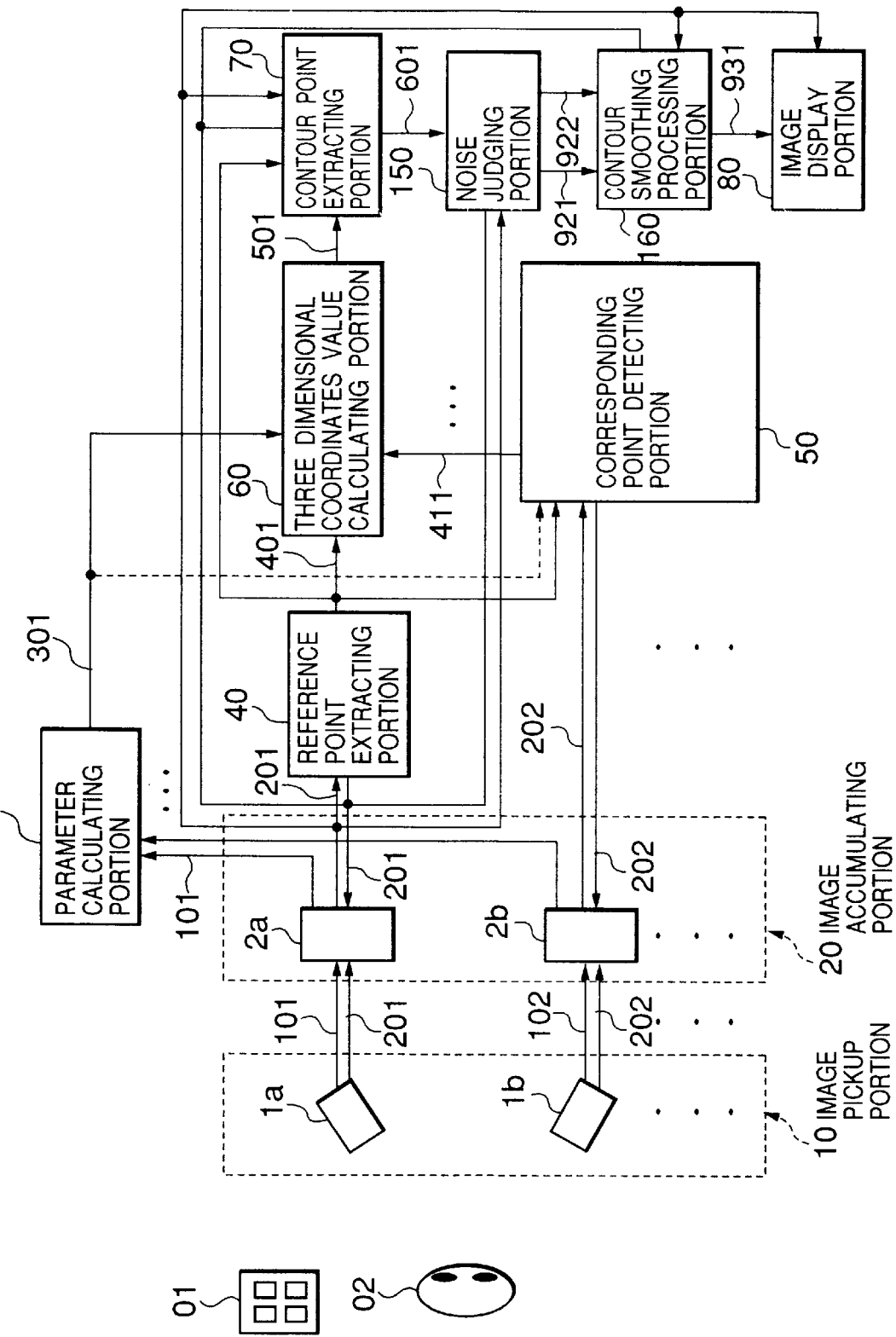
FIG. 4 is a block diagram showing a structure of an image processor in the fourth preferred embodiment according to the present invention.

FIG. 4 is a block diagram showing a structure of an image processor in the fourth preferred embodiment according to the present invention.

In reference to FIG. 4, in the same manner as in the first preferred embodiment shown in FIG. 1, an image processor in the first preferred embodiment comprises an image pickup portion 10 to take in an image of an object, an image accumulating portion 20 that accumulates images taken by the image pickup portion 10, a parameter calculating portion 30 that analyzes images of a reference solid and calculates parameters necessary for multiple image processing, a reference point extracting portion 40 that extracts a reference point to be used in object extraction from images taken by the image pickup portion 10, a corresponding point detecting portion 50 that detects a corresponding point in plural images captured by the image pickup portion 10, a three dimensional coordinates value calculating portion 60 that calculates a three dimensional coordinates value of an object in an image, a contour point extracting portion 70 that extracts a contour point to form a contour of an object in images, an object display control portion 80 that displays the object portion extracted from input image 80 in an image, and in addition, a noise judging portion 150 that detects noise among the contour points extracted by the contour point extracting portion 70, and a contour smoothing processing portion 160 that corrects the portion which is judged as noise by the noise judging portion 150. In FIG. 4, only a feature structure of the present preferred embodiment is described, and other general structures are omitted herein.

In the above structure, the respective components except the noise judging portion 150 and the contour smoothing processing portion 160 are the same as the respective components with identical codes in the first preferred embodiment, therefore, their explanations are omitted herein. In the present preferred embodiment too, it is supposed for simple understanding that the image pickup portion 10 has two units of image pickup devices 1a and 1b and the image accumulating portion 20 has two units of image accumulating devices 2a and 2b.

The noise judging portion 150 is realized by a program controlled CPU and RAM and other memories. And by using the coordinate value 601 of the object contour point that is output from the contour point extracting portion 70, it investigates the continuity of contours, and judges whether the extracted object contour point is. And according to the judgment results, it is clarified whether a true contour point or a noise, and outputs its coordinate values 921 and 922.

The contour smoothing processing portion 160 is realized by a program controlled CPU and RAM and other memories. And it corrects the portion which is judged as noise among object contour points by the noise judging portion 150, and corrects it on the basis of the continuity of contours, and outputs the coordinate value of the corrected contour point to the object display control portion 80.

In reference to FIG. 14, the actions of the noise judging portion 150 are explained in details hereinafter.

Figure 14:
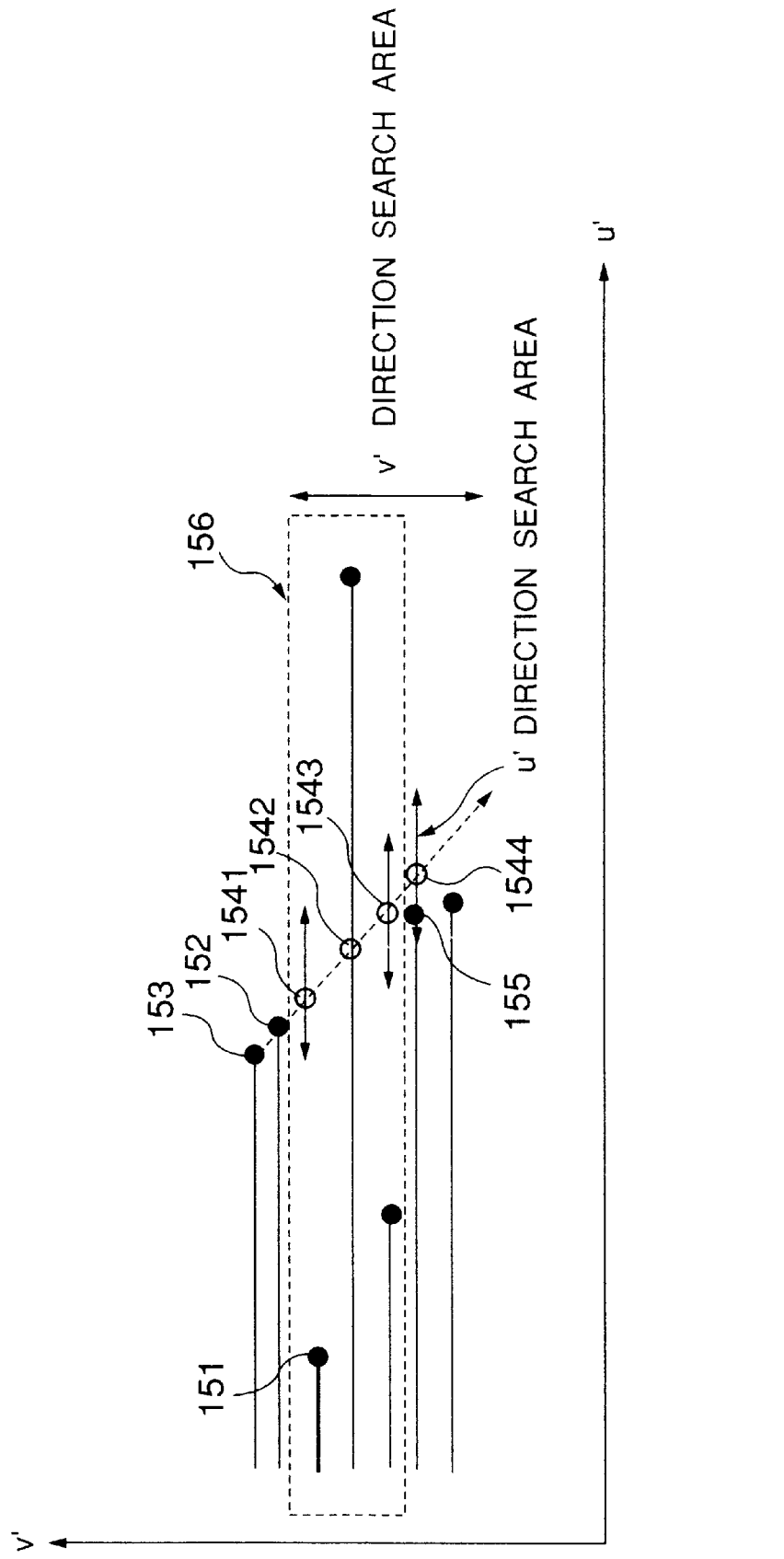
FIG. 14 is a diagram showing the contents of a search processing of a contour discontinuous portion.

In reference to FIG. 14, the noise judging portion 150, first scans the images based on the image data 201, from the top to the bottom in unit of horizontal line, and investigates the object contour point indicated by the coordinate value 601 (Refer to FIG. 4.), and searches for the points where continuity is conspicuously corrupted such as contour points 151 and 152. The judgment of this continuity is carried out by the comparison between a specified threshold value and the ul coordinate value of the contour points 151 and 152. The threshold value may be predetermined and stored in internal memory, or may be given by setting input from the outside.

At the event of detection of a discontinuous portion such as contour points 151 and 152, the contour point 151 positioned under is set as an attention contour point, and the contour point 152 positioned directly above is set as a comparative contour point. And the point on the same horizontal line as the attention contour point where the comparative contour point is same as the ul coordinate value is set as an reference contour point 153. And from the comparative contour point 152 and the forecast reference contour point 153, the inclination of the contour is forecasted, and the inclination forecast positions in the respective horizontal lines in vl direction research area in an appropriate range below the attention contour point is set, and coordinate values are calculated and stored.

In the next place, in an appropriate ul direction research area with the inclination forecast point at center on the respective horizontal lines, object contour points are searched from the horizontal line including the attention contour point to the bottom. If an end point candidate is found in this operation, then search is stopped, and the end point candidate point is set as an end contour point 155.

Herein, the area between the search horizontal line including the comparative contour point and the search horizontal line including the end contour point 155 is set as a noise portion 156.

The coordinate value 922 of the inclination forecast points 1541, 1542, . . . in the noise portion 156 that is obtained in the above manner, and the coordinate value 921 of other object contour points than the noise portion 156 are output to the contour smoothing processing portion 160.

In reference to FIG. 15, the actions of the contour smoothing processing portion 160 are explained in detail hereinafter.

Figure 15:
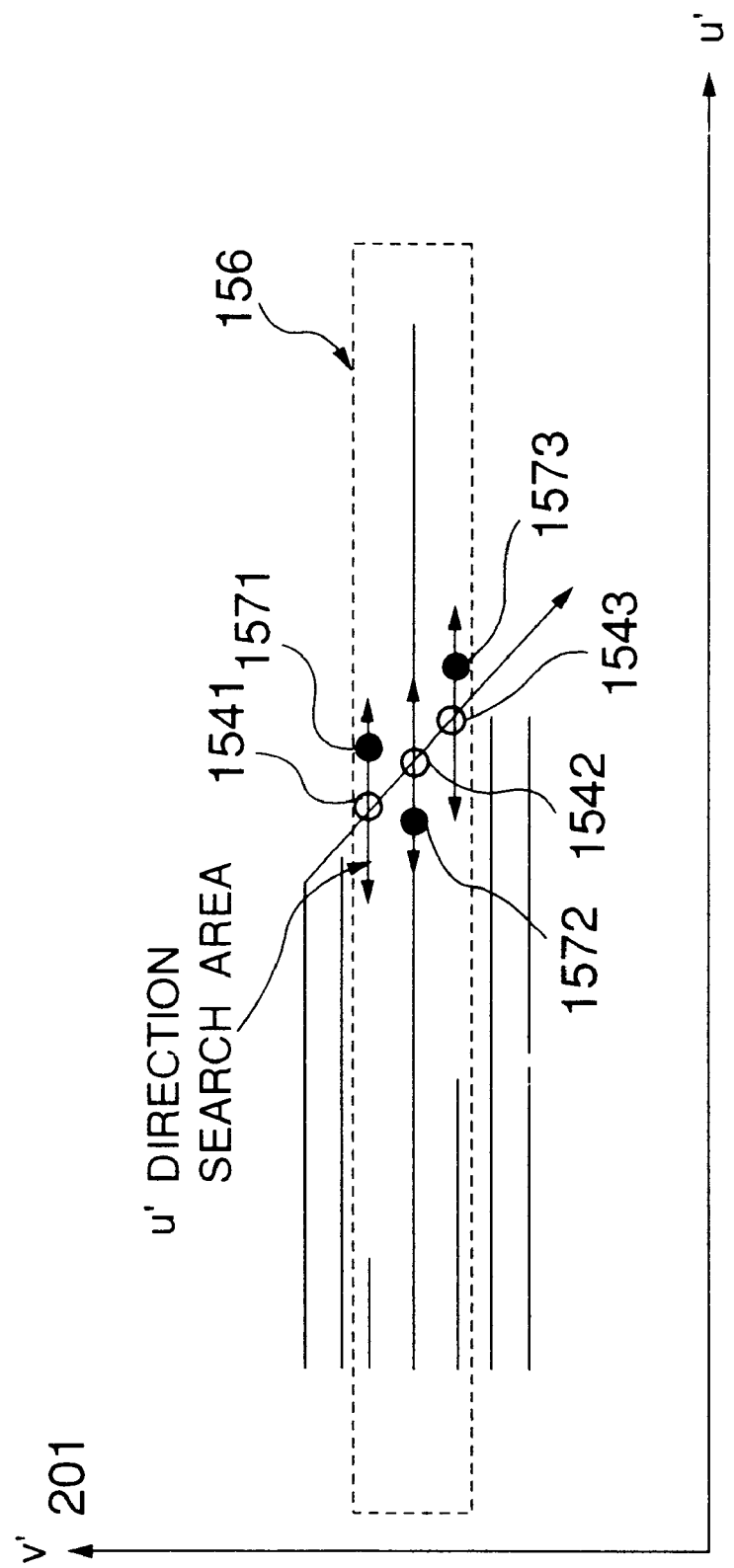
FIG. 15 is a diagram showing the contents of a compensating processing of a contour discontinuous portion.

In reference to FIG. 15, on the same horizontal line in images based on the image data 201, the contour smoothing processing portion 160 searches for the feature points mainly on the respective inclination forecast points 1541, 1542, . . . in the same manner as the reference point extracting portion 40, and sets the feature point nearest to the inclination forecast point, and updates the coordinate value. After the updating of the object contour points of all the noise portions 156, the coordinate values 931 of all the object contour points are output to the object display control portion 80.

As explained above, according an image processor of the present preferred embodiment, in addition to the effects attained by the first preferred embodiment hereunder, since what is judged as noise among extracted object contour points is corrected into a true contour point, it is possible to improve the precision of object image extraction, and to reduce noise in an image.

Besides the preferred embodiments described above, the noise correcting portion 140 in the third preferred embodiment, the noise judging portion 150 and the contour smooth processing portion 160 in the fourth preferred embodiment may be added to the second preferred embodiment wherein block size in block matching designated and plural object images are extracted, and synthesized into an object image.

As described heretofore, according to the present invention, when an image of an object is extracted from images obtained by plural image pickup devices, a three dimensional coordinates value in a feature point (reference point) of the image concerned is calculated, and an object image is extracted by using the three dimensional coordinates value concerned, as a consequence, there is an effect that it is easy to determine the threshold value to decide an area of extraction as an object image.

And since a desired feature point is extracted from images by using the parameter obtained in photographing of a reference solid where well known pattern is painted, and the three dimensional coordinates value is calculated too, there is no need to adjust the position and posture of the image pickup devices, as a consequence, there is another effect that efforts required for extraction processing of an object image are reduced to a great extent.

And further, according to the present invention, there is no need to prepare an object color data, brightness data and three dimensional position data as advance data, or to use unstable data that will be affected by infrared light radiation, or other active means or illumination conditions such as focal point data and so forth, as a result, there is still another effect that stable processing results are expected.

Moreover, according to the present invention, there is a further effect that in addition of a means to extract plural object images by using the block matching results by plural block sizes and synthesize them into a target object image, or a means to correct what is judged as noise among extracted object contour points into a true contour point, it is possible to improve the extraction precision of object images further more, and to obtain object image with low noise.

As this invention may be embodied in several forms without departing from the spirit of essential features thereof, the present embodiment is therefore illustrative and not restrictive, since the scope of the invention is defined by the appended claims rather than by the description preceding them, and all changes that fall within meets and bounds of the claims, or equivalence of such as meets and bounds are therefore intended to embraced by the claims.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. An image processor that extracts only an image of a specific object from input images, comprising:

an image pickup means that is equipped with plural image pickup devices for picking up said object;

a parameter calculating means for extracting feature points on a reference solid from the images obtained by picking up said reference solid where a known pattern is picked up by said image pickup means, and calculating the relative position and posture parameters of each said image pickup device arranged on said image pickup means;

a reference point extracting means for extracting a reference point as a feature point having features on an image, wherein the image is one image of plural images picked up by said image pickup means, and calculating coordinate values of said image of the reference point;

a corresponding point detecting means for detecting corresponding points to be feature points having features on an image which correspond with said reference points, wherein said corresponding points are detected for all the images except the images that extract said reference points, among said plural images, by coordinate values of said reference points extracted by said reference point extracting means, and calculating coordinate values in each image at the corresponding points;

a three dimensional coordinates calculating means for calculating coordinate values in the three dimensional space of said reference points, by using the relative position and posture parameters of each said image pickup device calculated by said parameter calculating means, coordinate values of said reference points extracted by said reference point extracting means, and coordinate values of said corresponding points detected by said corresponding point detecting means;

a contour point extracting means for extracting contour points showing a contour of said object among images picked up by said image pickup means, on the basis of coordinate values of said reference points extracted by said reference point extracting means and said three dimensional coordinates values calculated by said three dimensional coordinates value calculating means, and calculating their coordinate values; and an object display means for extracting an image of said object from images picked up by said image pickup means based on coordinate values of said contour points extracted by said contour point extracting means, and displaying them on a display device.

2. An image processor as set forth in claim 1, wherein said parameter calculating means, extracts six feature points or more having features on image from plural planes of said reference solid, and calculates their coordinate values, and and calculates said parameters by using the least square method in equations including said calculated coordinate values.

3. An image processor as set forth in claim 1, wherein, said corresponding point detecting means, leads a straight line including said corresponding points corresponding to said reference points, in other images than images that extract said reference points, by using parameters calculated by said parameter calculating means, searches for candidates of point corresponding to be feature points having features on image, on said straight line, and carries out a block matching processing on the searched the above corresponding point candidate, and makes said corresponding point candidates as corresponding points where an obtained block error is below a threshold value.

4. An image processor as set forth in claim 1, wherein said parameter calculating means, extracts six feature points or more having features on image from plural planes of said reference solid, and calculates their coordinate values, and calculates said parameters by using the least square method in equations including said calculated coordinate values, said corresponding point detecting means, leads a straight line including said corresponding points corresponding to said reference points, in other images than images that extract said reference points, by using parameters calculated by said parameter calculating means, searches for candidates of point corresponding to be feature points having features on image, on said straight line, and carries out a block matching processing on the searched the above corresponding point candidates, and makes said corresponding point candidates as corresponding points at which an obtained block error is below a threshold value.

5. An image processor as set forth in claim 1, further comprising:

a noise correcting means for judging whether each said extracted contour point is a true contour point or a noise based on the presence or absence of continuity of the coordinate values in each said contour point extracted by said contour point extracting means, and to a portion that is judged as a noise, extracting other candidates of contour points on the basis of coordinate values of a true contour point near the portion, and outputting them to said corresponding point detecting means and said three dimensional coordinates calculating means, and outputting the coordinate values of the contour points where there is no noise portion or noise portion has been corrected to said object display means, wherein said corresponding point detecting means detects corresponding points based on the contour point candidate, when contour point candidates are input from said noise correcting means, said three dimensional coordinates calculating means calculates three dimensional coordinates values of the contour point on the basis of corresponding points of the contour point candidates detected by contour point candidate and said corresponding point detecting means, when contour point candidates are input from said noise correction means, and said object display means extracts an image of said object from images photographed by said image pickup means based on coordinate values of the contour point input from said noise correction means.

6. An image processor as set forth in claim 1, further comprising:

a noise correcting means for judging whether each said extracted contour point is a true contour point or a noise based on the presence or absence of continuity of the coordinate values in each said contour point extracted by said contour point extracting means, and to a portion that is judged as a noise, extracting other contour candidate points based on coordinate values of a true contour point near the portion, and outputting them to said corresponding point detecting means and said three dimensional coordinates calculating means, and outputting the coordinate values of the contour points where there is no noise portion or noise portion has been corrected to said object display means, wherein said corresponding point detecting means, leads a straight line including said corresponding points corresponding to said reference points, in other images than images that extract said reference points, by using parameters calculated by said parameter calculating means, searches for corresponding point candidates to be feature points having features on image, on said straight line, carries out a block matching processing on the searched above corresponding point candidate, and makes said corresponding point candidates as corresponding points at which an obtained block error is below a threshold value, and when contour point candidates are input from said noise correcting means, detects corresponding points based on the contour point candidates, said three dimensional coordinates calculating means calculates three dimensional coordinates values of the contour point based on corresponding points of the contour point candidates detected by contour point candidate and said corresponding point detecting means, when contour point candidates are input from said noise correction means, and said object display means extracts an image of said object from images photographed by said image pickup means based on coordinate values of the contour point input from said noise correction means.

7. An image processor as set forth in claim 1, further comprising:

a noise judging means for judging whether each said contour point extracted based on the presence or absence of continuity of coordinate values in each said contour point extracted by said contour point extracting means is a true contour point or a noise, a contour smoothing processing means for correcting the contour point that said noise judging means judges as a noise in consideration of the continuity with other contour points that are judged as true, and outputting it to said object display means, wherein said object display means extracts an image of said object from images photographed by said image pickup means based on the coordinate values of the corrected contour point input from said contour smoothing processing means, and displays it on a display device.

8. An image processor set forth in claim 1, further comprising:

a noise judging means for judging whether each said contour point extracted based on the presence or absence of continuity of coordinate values in each said contour point extracted by said contour point extracting means is a true contour point or a noise, a contour smoothing processing means for correcting the contour point that said noise judging means judges as a noise in consideration of the continuity with other contour points that are judged as true, and outputting it to said object display means, wherein said object display means, extracts an image of said object from images photographed by said image pickup means based on the coordinate values of the corrected contour point input from said contour smoothing processing means, and displays it on a display device, said corresponding point detecting means, leads a straight line including said corresponding points corresponding to said reference points, in other images than images that extract said reference points, by using parameters calculated by said parameter calculating means, searches for candidates of points corresponding to be feature points having features on image, on said straight line, and carries out a block matching processing on the searched above corresponding point candidate, and makes said corresponding point candidates as corresponding points at which an obtained block error is below a threshold value.

9. An image processor as set forth in claim 1, wherein said reference solid is not the same as said object.

10. An image processor that extracts only an image of a specific object from input images, comprising:

an image pickup means that is equipped with plural image pickup devices for picking up said object;

a parameter calculating means for extracting feature points on a reference solid from the images obtained by picking up said reference solid where a known pattern is picked up by said image pickup means, and calculating the relative position and posture parameters of each said image pickup device arranged on said image pickup means;

a reference point extracting means for extracting a reference point as a feature point having features on an image, wherein the image is one image of plural images picked up by said image pickup means, and calculating coordinate values of said image of the reference point;

a corresponding point detecting means for detecting corresponding points to be feature points having features on an image which correspond with said reference points, wherein said corresponding points are detected for all the images except the images that extract said reference points, among said plural images, by coordinate values of said reference points extracted by said reference point extracting means, and carrying out a block matching processing by using plural size blocks to the corresponding point candidate, and setting all said corresponding point candidates where obtained block error is below a threshold value as corresponding points, and calculating the unit of coordinate value in each image of all the corresponding points;

a block size designating means for designating the block size to be used in said block matching;

a three dimensional coordinates calculating means for calculating coordinate values in the three dimensional space of said reference point per coordinate value of said corresponding point, by using the relative position and posture parameters of each said image pickup device calculated by said parameter calculating means, coordinate values of said reference point extracted by said reference point extracting means, and unit of coordinate values of said corresponding points detected by said corresponding point detecting means;

an object extracting means fore extracting a contour point to show a contour of said object from images picked up by said image pickup means per said three dimensional coordinate value, based on unit of coordinate value of said reference point extracted by said reference point extracting means and said three dimensional coordinates value calculated by said three dimensional coordinates value calculating means, and calculating its coordinate value, and based on each coordinate value of the contour point, extracting an image of said object from images photographed by said image pickup means and creating unit of object image; and an image synthesizing means for synthesizing unit of object image created by said object extracting means and displaying it on a display device.

11. An image processor as set forth in claim 10, wherein said parameter calculating means, extracts six feature points or more having features on image from plural planes of said reference solid, and calculates their coordinate values, and and calculates said parameters by using the least square method in equations including said calculated coordinate values.

12. An image processor as set forth in claim 10, wherein, said corresponding point detecting means, leads a straight line including said corresponding points corresponding to said reference points, in other images than images that extract said reference points, by using parameters calculated by said parameter calculating means, searches for corresponding point candidates to be feature points having features on image, on said straight line, and carries out a block matching processing on the searched above corresponding point candidate by using the block of size designated by said block size designating device.

13. An image processor as set forth in claim 10, wherein said parameter calculating means, extracts six feature points or more having features on image from plural planes of said reference solid, and calculates their coordinate values, and calculates said parameters by using the least square method in equations including said calculated coordinate values, said corresponding point detecting means, leads a straight line including said corresponding points corresponding to said reference points, in other images than images that extract said reference points, by using parameters calculated by said parameter calculating means, searches for corresponding point candidates to be feature points having features on image, on said straight line, and carries out a block matching processing on the searched above corresponding point candidate by using the block of size designated by said block size designating device.

14. An image processor set forth in claim 10, further comprising:

a noise correcting means for judging whether said extracted contour point is a true contour point or a noise based on the presence or absence of continuity of the coordinate values in said contour point extracted by said contour point extracting means, and to a portion that is judged as a noise, extracting other contour candidate points based on coordinate values of a true contour point near the portion, and outputting them to said corresponding point detecting means and said three dimensional coordinates calculating means, and outputting the coordinate values of the contour points where there is no noise portion or noise portion has been corrected to said object display means, wherein said corresponding point detecting means detects corresponding points based on the contour point candidate, when contour point candidates are input from said noise correcting means, said three dimensional coordinates calculating means calculates three dimensional coordinates values of the contour point based on corresponding points of the contour point candidates detected by contour point candidate and said corresponding point detecting means, when contour point candidates are input from said noise correction means, and said object display means extracts an image of said object from images photographed by said image pickup means based on coordinate values of the contour point input from said noise correction means.

15. An image processor as set forth in claim 10, further comprising:

a noise correcting means for judging whether said extracted contour point is a true contour point or a noise based on the presence or absence of continuity of the coordinate values in said contour point extracted by said contour point extracting means, and to a portion that is judged as a noise, extracting other contour candidate points based on coordinate values of a true contour point near the portion, and outputting them to said corresponding point detecting means and said three dimensional coordinates calculating means, and outputting the coordinate values of the contour points where there is no noise portion or noise portion has been corrected to said object display means, wherein said corresponding point detecting means, leads a straight line including said corresponding points corresponding to said reference points, in other images than images that extract said reference points, by using parameters calculated by said parameter calculating means, searches for candidate of points corresponding to be feature points having features on image, on said straight line, carries out a block matching processing on the searched above corresponding point candidate, and makes said corresponding point candidates as corresponding points at which an obtained block error is below a threshold value, and when contour point candidates are input from said noise correcting means, detects corresponding points based on the contour point candidates, said three dimensional coordinates calculating means calculates three dimensional coordinates values of the contour point based on corresponding points of the contour point candidates detected by contour point candidate and said corresponding point detecting means, when contour point candidates are input from said noise correction means, and said object display means extracts an image of said object from images photographed by said image pickup means based on coordinate values of the contour point input from said noise correction means.

16. An image processor set forth in claim 10, further comprising:

a noise judging means for judging whether said contour point extracted based on the presence or absence of continuity of coordinate values in said contour point extracted by said contour point extracting means is a true contour point or a noise, a contour smoothing processing means for correcting the contour point that said noise judging means judges as a noise in consideration of the continuity with other contour points that are judged as true, and outputting it to said object display means, wherein said object display means extracts an image of said object from images photographed by said image pickup means based on the coordinate values of the corrected contour point input from said contour smoothing processing means, and displays it on a display device.

17. An image processor as set forth in claim 10, further comprising:

a noise judging means for judging whether said contour point extracted based on the presence or absence of continuity of coordinate values in said contour point extracted by said contour point extracting means is a true contour point or a noise, a contour smoothing processing means for correcting the contour point that said noise judging means judges as a noise in consideration of the continuity with other contour points that are judged as true, and outputting it to said object display means, wherein said object display means, extracts an image of said object from images photographed by said image pickup means based on the coordinate values of the corrected contour point input from said contour smoothing processing means, and displays it on a display device, said corresponding point detecting means, leads a straight line including said corresponding points corresponding to said reference points, in other images than images that extract said reference points, by using parameters calculated by said parameter calculating means, searches for corresponding point candidates to be feature points having features on image, on said straight line, and carries out a block matching processing on the searched above corresponding point candidate, and makes said corresponding point candidates as corresponding points at which an obtained block error is below a threshold value.

18. An image processor as set forth in claim 10, wherein said reference solid is not the same as said object.

19. A method of extracting an image, the method comprising:

taking two images of a reference object at approximately the same time, a first image with a first camera and a second image with a second camera, wherein the first and second cameras are in different positions;

determining position and orientation of each of the cameras by analyzing the two images of the reference object;

taking two images of a second object at approximately the same time, a third image with the first camera and a fourth image with the second camera;

selecting a feature point in the third image;

locating a corresponding point in the fourth image, which corresponds to the feature point, by forming an Epipolar line; and determining the three-dimensional coordinates of the feature point.

* * * * *